US008827283B2

(12) United States Patent
Homan et al.

(10) Patent No.: US 8,827,283 B2
(45) Date of Patent: Sep. 9, 2014

(54) MOUNTING SYSTEM AND METHOD OF INSTALLING A CHILD SUPPORT ACCESSORY ON A STROLLER FRAME

(75) Inventors: Maurits Homan, Amsterdam (NL); Thomas van der Schoor, Amsterdam (NL); Erik Baas, Utrecht (NL); Jonathan K Mountz, Geigertown, PA (US)

(73) Assignee: Nuna International B.V., Amsterdam (NL)

( * ) Notice: Subject to any disclaimer, the term of this patent is extended or adjusted under 35 U.S.C. 154(b) by 212 days.

(21) Appl. No.: 12/987,493

(22) Filed: Jan. 10, 2011

(65) Prior Publication Data
US 2011/0241395 A1 Oct. 6, 2011

Related U.S. Application Data

(60) Provisional application No. 61/341,549, filed on Apr. 1, 2010.

(51) Int. Cl.
*B62B 7/14* (2006.01)
*B62B 7/10* (2006.01)
*B62B 9/10* (2006.01)

(52) U.S. Cl.
CPC ............... *B62B 9/104* (2013.01); *B62B 7/142* (2013.01); *B62B 7/105* (2013.01)
USPC .................... 280/47.39; 280/47.38; 280/650; 297/256.14; 248/503.1

(58) Field of Classification Search
CPC ................................. B62B 7/142; B62B 7/10
USPC ............ 280/650, 47.38, 47.39, 658; 403/321, 403/326, 361, 353, 354, 322.1, 322.4, 325, 403/91–93, 99; 297/256.16, 256.14; 292/207, 106, 107; 248/503, 503.1
See application file for complete search history.

(56) References Cited

U.S. PATENT DOCUMENTS

| 320,243 | A | * | 6/1885 | Halsted | 248/503.1 |
| 330,876 | A | * | 11/1885 | Davis | 248/503.1 |
| 435,726 | A | * | 9/1890 | Blethen | 248/503.1 |
| 542,536 | A | * | 7/1895 | Pfleegor | 248/503.1 |
| 4,306,749 | A | * | 12/1981 | Deloustal | 297/256.16 |
| 4,729,600 | A | * | 3/1988 | Single et al. | 297/256.13 |

(Continued)

FOREIGN PATENT DOCUMENTS

| CN | 2841450 | * 11/1999 |
| CN | 2752131 | * 9/2004 |

(Continued)

*Primary Examiner* — J. Allen Shriver, II
*Assistant Examiner* — Steve Clemmons
(74) *Attorney, Agent, or Firm* — David I. Roche; Baker & McKenzie LLP

(57) ABSTRACT

A mounting system includes at least one mounting fixture affixed on a stroller frame, and a connector affixed on a child support accessory. The connector can be inserted into the mounting fixture for locking the child support accessory in position on the stroller frame. The connector can lock with the mounting fixture in either of a rearward or forward facing configuration of the child support accessory. The construction of the stroller frame is such that it can be conveniently collapsed with the child support accessory installed thereon. Examples of the child support accessory can include a stroller seat module, a support adapter for carrycot or bassinet, and the like.

23 Claims, 35 Drawing Sheets

(56) References Cited

U.S. PATENT DOCUMENTS

| | | | |
|---|---|---|---|
| 4,832,361 A | 5/1989 | Nakao et al. | |
| 5,074,575 A * | 12/1991 | Bigo | 280/642 |
| 5,330,245 A * | 7/1994 | Boisset | 296/65.03 |
| 5,562,322 A * | 10/1996 | Christoffel | 296/65.03 |
| 5,578,794 A * | 11/1996 | Lamb et al. | 174/535 |
| 5,746,478 A * | 5/1998 | Lumley et al. | 297/256.13 |
| 5,947,555 A * | 9/1999 | Welsh et al. | 297/130 |
| 5,997,069 A * | 12/1999 | Coffey et al. | 296/65.03 |
| 6,116,624 A | 9/2000 | Hu | |
| 6,431,632 B1 * | 8/2002 | Kozikowski et al. | 296/65.03 |
| 6,508,605 B1 | 1/2003 | Cheng | |
| 6,530,591 B2 | 3/2003 | Huang | |
| 6,695,400 B2 * | 2/2004 | Washizuka et al. | 297/130 |
| 6,715,828 B1 * | 4/2004 | Cheng | 297/183.3 |
| 6,824,161 B2 | 11/2004 | Iwata | |
| 6,830,254 B2 | 12/2004 | Lan | |
| 6,851,700 B2 | 2/2005 | Yoshie et al. | |
| 6,942,294 B2 * | 9/2005 | Takamizu | 297/256.16 |
| 6,951,342 B2 | 10/2005 | Lan | |
| 7,021,650 B2 | 4/2006 | Chen | |
| 7,273,225 B2 | 9/2007 | Yeh | |
| 7,401,803 B1 | 7/2008 | Lai | |
| 7,513,512 B2 | 4/2009 | Yoshie et al. | |
| 2006/0213455 A1 | 9/2006 | Bien | |

FOREIGN PATENT DOCUMENTS

| | | | | |
|---|---|---|---|---|
| CN | 2787534 | * | 2/2005 | |
| CN | 2346321 | * | 11/2006 | |
| CN | 201040497 | * | 12/2006 | |
| CN | 1319796 | * | 6/2007 | |
| CN | 101096212 A | | 1/2008 | |
| CN | 201077473 | * | 6/2008 | |
| CN | 201082716 Y | | 7/2008 | |
| CN | 201154720 | * | 11/2008 | |
| CN | 101553391 | * | 10/2009 | |
| EP | 1693277 A2 | | 8/2006 | |
| EP | 1918155 A2 | | 7/2008 | |
| EP | 1970284 A1 | * | 9/2008 | B62B 7/14 |
| EP | 1970284 A2 | | 9/2008 | |
| GB | 2389082 A | * | 12/2003 | B62B 7/14 |
| TW | 311627 M | | 10/1995 | |
| TW | 275137 | * | 4/2005 | |
| WO | 2008148880 A2 | | 12/2008 | |

* cited by examiner

MOUNTING SYSTEM AND METHOD OF INSTALLING A CHILD SUPPORT ACCESSORY ON A STROLLER FRAME

CROSS-REFERENCE TO RELATED APPLICATION

This application claims priority of U.S. Provisional Application No. 61/341,549, filed on Apr. 1, 2010.

BACKGROUND OF THE INVENTION

1. Field of the Invention

The present invention relates to a stroller apparatus, and more particularly to a mounting system and method of installing a child support accessory on a stroller frame.

2. Description of the Related Art

Some strollers currently available may incorporate a mounting system that allows to detachably install a seat on the stroller frame. In certain constructions, the seat can also be disposed in either of a forward and rear facing configuration. However, the design of the current mounting system renders the stroller frame heavy and does not allow compact folding. Generally, the seat must be removed from the mounting system before the stroller frame can be folded. Moreover, the transition between forward and rearward facing configurations can be difficult to operate for the consumer.

Therefore, there is a need for a mounting system for a stroller frame that can be easily operated and address at least the foregoing issues.

SUMMARY

The present application describes a mounting system and a method of installing a child support accessory on a stroller frame. The mounting system includes at least one mounting fixture affixed on the stroller frame, and a connector affixed on the child support accessory. The connector can be inserted into the mounting fixture for locking the child support accessory in position on the stroller frame. The connector can lock with the mounting fixture in either of a rearward or forward facing configuration of the child support accessory. The construction of the stroller frame is such that it can be conveniently collapsed with the child support accessory installed thereon. Examples of the child support accessory can include a stroller seat module, a support adapter for carrycot or bassinet, and the like.

In one embodiment, the mounting system comprises a mounting fixture provided on the stroller frame, and a connector provided on the child support accessory. The connector is adapted to releasibly lock with the mounting fixture in either of a first configuration for holding the child support accessory in a first position on the stroller frame, and a second configuration for holding the child support accessory in a second position on the stroller frame.

In other embodiments, a method for installing a child support accessory on a stroller frame is described. The method comprises providing a mounting fixture on a stroller frame, wherein the mounting fixture includes a housing having a slot and a first and second catching structure disposed on opposite sides of the slot, and providing a connector on a child support accessory, wherein the connector includes a first and second abutting portion formed on two opposite sides of the connector. The method also comprises putting the first abutting portion in contact with the first catching structure, and rotating the child support accessory about the first catching structure for inserting the connector into the slot, until the second abutting portion engages with the second catching structure for locking the child support accessory with the stroller frame.

DETAILED DESCRIPTION OF THE EMBODIMENTS

The present application describes a mounting system and a method of installing a child support accessory on a stroller frame. The mounting system includes at least one mounting fixture affixed on the stroller frame, and a connector affixed on the child support accessory. The connector can be inserted into the mounting fixture for locking the child support accessory in position on the stroller frame. The connector can lock with the mounting fixture in either of a rearward or forward facing configuration of the child support accessory. The construction of the stroller frame is such that it can be conveniently collapsed with the child support accessory installed thereon. Examples of the child support accessory can include a stroller seat module, a support adapter for carrycot or bassinet, and the like.

Figure 1:
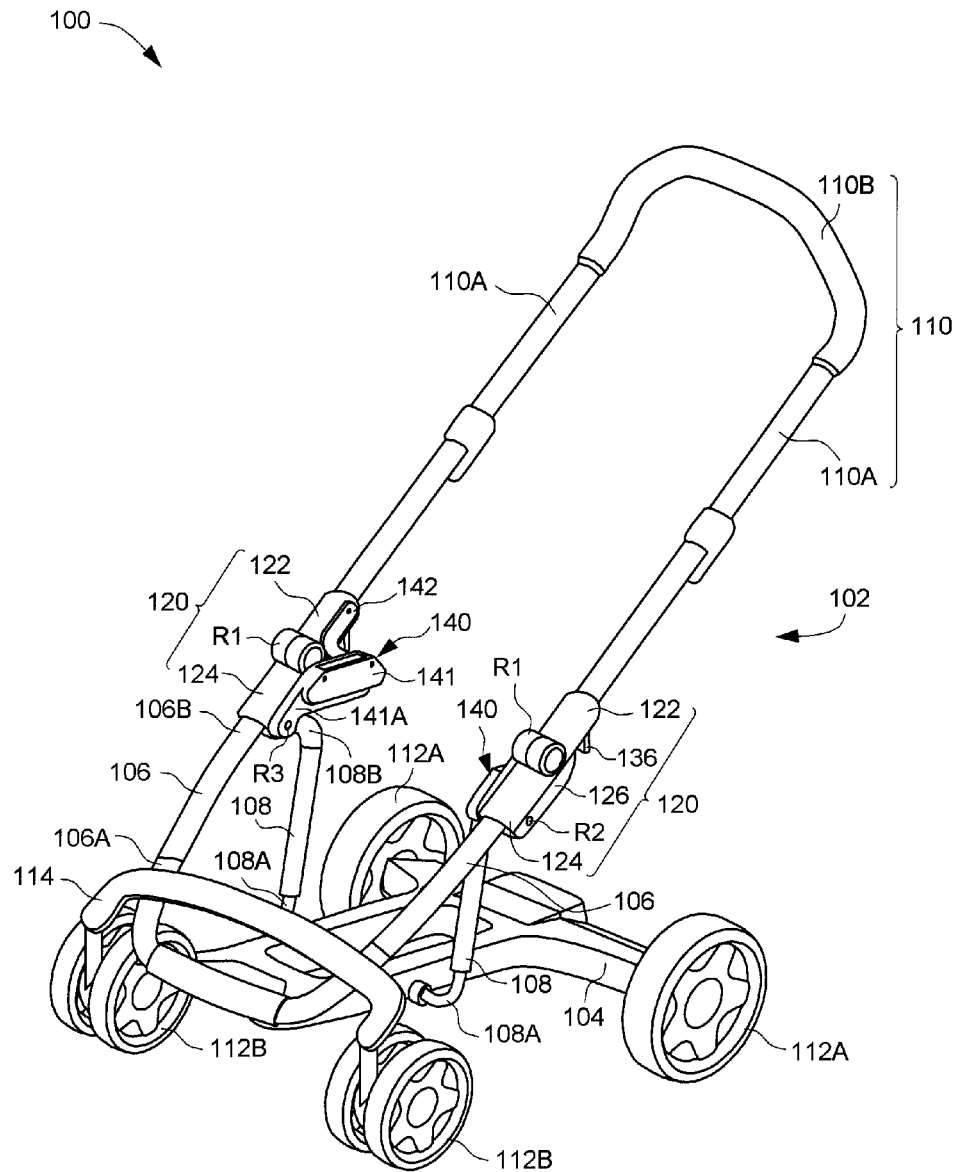
FIG. 1 is a perspective view illustrating one embodiment of a stroller apparatus.
Figure 2:
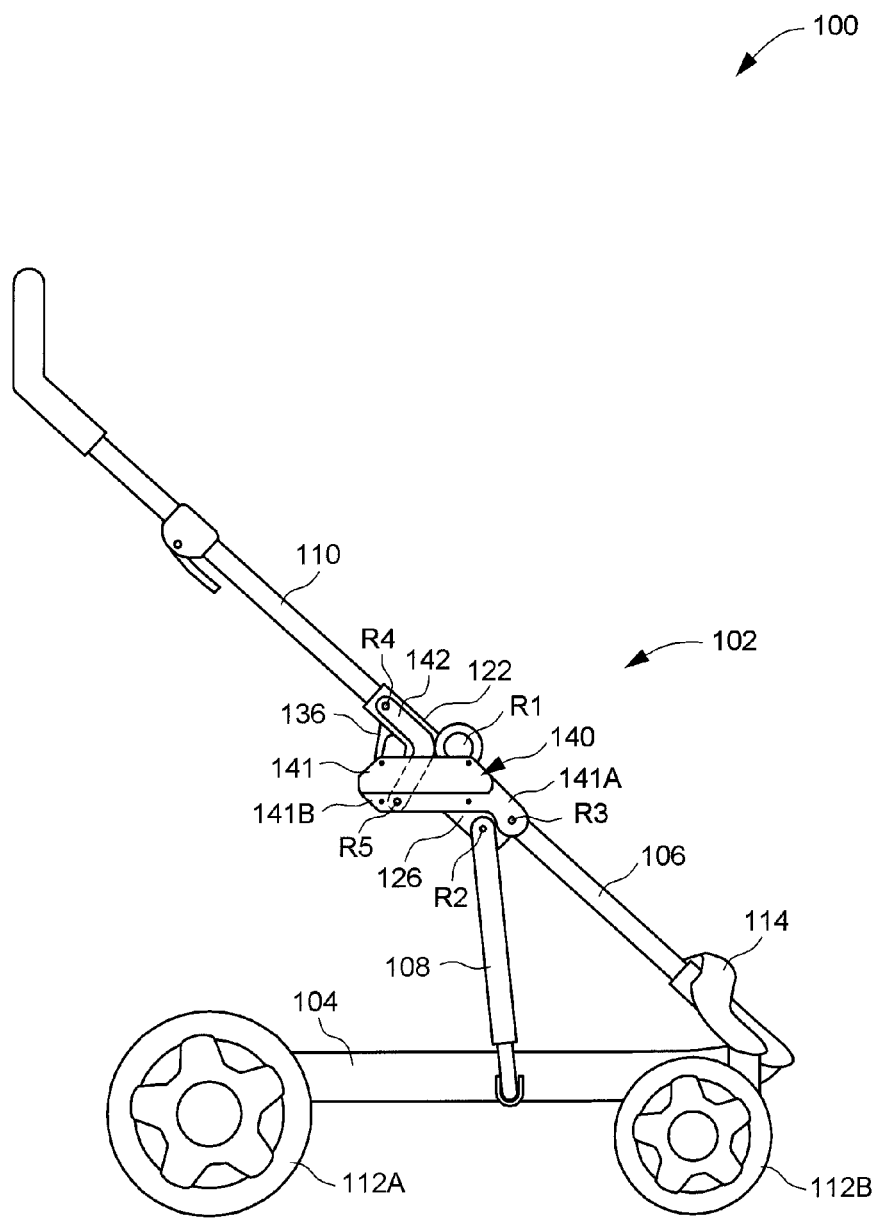
FIG. 2 is a schematic view illustrating one side portion of the stroller apparatus shown in FIG. 1.

FIG. 1 is a perspective view illustrating one embodiment of a stroller apparatus 100, and FIG. 2 is a schematic view illustrating one (left) side portion of the stroller apparatus 100 (the right side portion being symmetrical has been omitted for clarity of illustration). As shown, the stroller apparatus 100 comprises a collapsible stroller frame 102, which can include a base 104, a collapsible support structure comprised of first legs 106 and second legs 108, and a handle 110. The base 104 has an elongated shape that extends approximately horizontal from a rear to a front of the stroller apparatus 100. A rear portion of the base 104 can be provided with rear wheels 112A on the left and right sides thereof.

Each of the first legs 106 respectively has an elongated shape with a lower end 106A and upper end 106B. The lower ends 106A of the first legs 106 can be respectively connected with left and right portions of a transversal linkage 114. The transversal linkage 114 is pivotally connected with a front portion of the base 104 and has left and right ends provided with front wheels 112B. The transversal linkage 114 with the first legs 106 and front wheels 112B assembled thereon can be rotated between a collapsed state where the first legs 106 lie generally horizontal and parallel to the base 104, and a deployed state where the first legs 106 are erected in a standing position from the base 104. It will be appreciated that other assembly structures may be employed for pivotally connecting the first legs 106 with the base 104. For example, each lower end 106A of the first legs 106 may be respectively coupled with the base 104 through a distinct pivotal joint having a same axis of rotation, without the need of the transversal linkage 114.

Each of the second legs 108 respectively has an elongated shape with a lower end 108A and an upper end 108B. The lower ends 108A of the second legs 108 are pivotally coupled with left and right sides of the base 104 behind the first legs 106. Accordingly, the second legs 108 can also rotate along with the first legs 106 between a collapsed state lying generally parallel to the base 104 and a deployed state erecting from the base 104.

The handle 110 can have a U-shape including left and right handle side sections 110A approximately parallel to each other, and a transversal section 110B connecting between the two handle side sections 110A. A lower end portion of each handle side section 110A can be respectively coupled with the upper end 106B of one first leg 106 via a first pivot link R1, and with the upper end 108B of one second leg 108 via a second pivot link R2. As shown, the second pivot link R2 can be spaced apart and offset downward from the first pivot link R1. As a result, the handle 110 can be rotated to drive the first and second legs 106 and 108 in rotation for either collapsing or deploying the stroller frame 102.

For coupling the movements of the first and second legs 106 and 108 with the handle 110, a joint structure 120 may be provided on the left and right sides of the stroller frame 102. In one embodiment, the joint structure 120 can comprise a first coupling element 122 affixed with the lower end portion of each handle side section 110A, and a second coupling element 124 affixed with the upper end 106B of each first leg 106. The lower end portion of the handle side section 110A and the upper end 106B of the first leg 106 can be respectively inserted through the first and second coupling element 122 and 124, and a pivot connection (e.g., a pin, rivet or the like) can be passed there through for forming the first pivot link R1. In addition, the first coupling element 122 also includes an extension 126 that can be offset from and extend generally parallel to the handle side section 110A. The upper end 108B of the second leg 108 can be pivotally coupled with the extension 126 via the second pivot link R2 (e.g., a pin, rivet or the like) which is positioned below the first pivot link R1.

Figure 3:
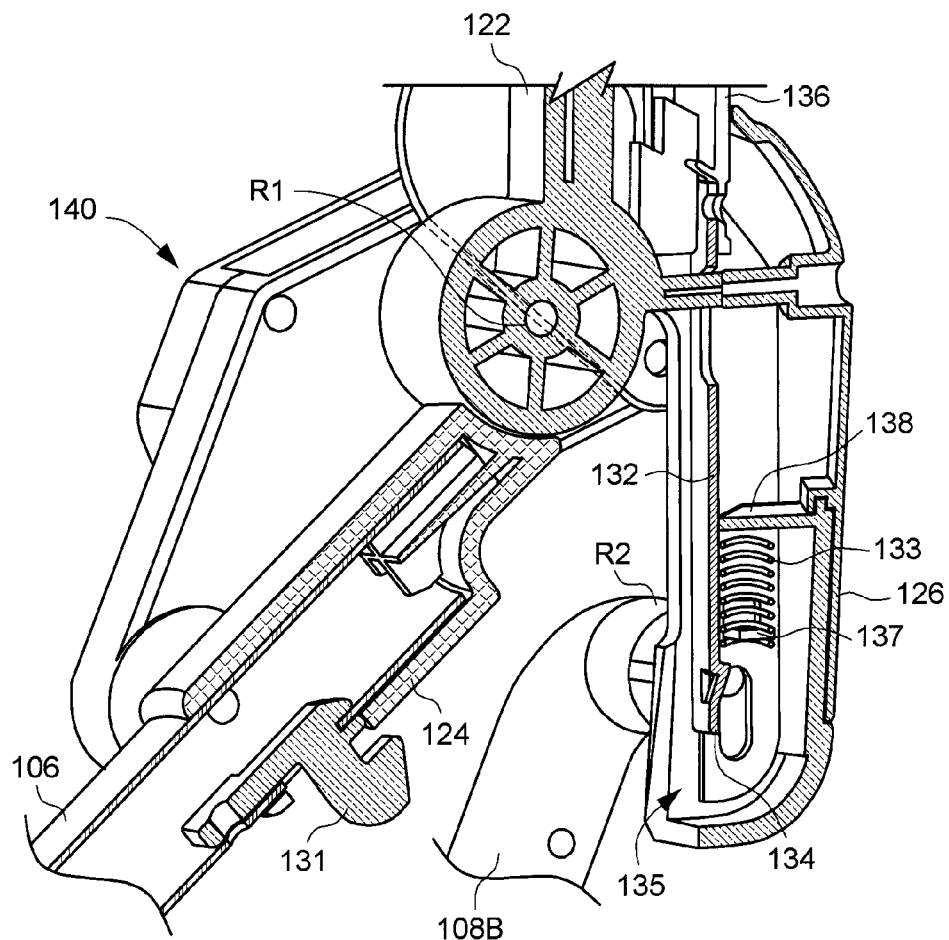
FIG. 3 is a schematic view illustrating one embodiment of a latch mechanism incorporated in a joint structure connecting a handle with a leg of the stroller frame shown in FIG. 1.

In one embodiment, the joint structure 120 can also incorporate a latch mechanism for locking the handle 110 with each of the first legs 106 when the stroller frame 102 is deployed for use. FIG. 3 is a schematic view illustrating one embodiment of such latch mechanism, comprising a hook element 131, a slider latch 132 and a spring element 133. The hook element 131 may be affixed at one end portion of the first leg 106 proximate to the first pivot link R1. In turn, the slider latch 132 may be assembled in a hollow interior of the extension 126 for translational movements along a length of the extension 126. The slider latch 132 can have an engagement tip 134 located adjacent to a side opening 135 of the extension 126. One end of the slider latch 132 opposite to the engagement tip 134 can be connected with a release handle 136. The spring element 133 can have one end anchored with a protruding rib 137 of the slider latch 132, and an opposite end connected with an inner rib 138 of the extension 126.

When the stroller frame 102 is deployed for use, the second coupling element 124 can lie adjacent to the extension 126, and the hook element 131 can insert through the side opening 135 and engage with the engagement tip 134 of the slider latch 132. The slider latch 132 can be biased in the locked position with the hook element 131 by action of the spring element 133. The handle 110 and first legs 106 can be thereby locked with each other in the deployed state. When the release handle 136 is operated, the slider latch 132 can be driven in movement for compressing the spring element 133 and disengage from the hook element 131. Being unlocked, the handle 110 can be then rotated to drive folding of the first and second legs 106 and 108 for collapsing the stroller frame 102.

Referring again to FIGS. 1 and 2, in order to attach a child support accessory (such as a stroller seat module, a support adapter, or the like) on the stroller frame 102, two mounting fixtures 140 can be provided on the left and right sides of the stroller frame 102. As shown, each of the mounting fixtures 140 can be provided on an inner side of the handle 110 and the first legs 106. More specifically, each mounting fixture 140 can include a housing 141 having an elongated shape with a front end 141A and a rear end 141B, the front end 141A extending downward from the rear end 140B. The front end 141A of the housing 141 can be pivotally coupled with the upper end 106B of the first leg 106 (e.g., at the second coupling element 124) through a third pivot link R3. In turn, the rear end 141B of the housing 141 can be operatively connected with the handle 110 via a link arm 142. The link arm 142, which may be formed in a single piece, can have a generally V-shape with a first end coupled with the lower end portion of the handle side section 110A (e.g., at the first coupling element 122) via a fourth pivot link R4, and a second end coupled with the rear end 141B of the housing 141 via a fifth pivot link R5. The mounting fixture 140 can thereby have a front end pivotally coupled with the first leg 106 via the pivot link R3, and a rear end pivotally coupled with the link arm 142 via the pivot link R5 at a higher position than the pivot link R3. Each of the pivot links described previously can be formed by engaging a transversal pin, shaft, rivet, or like element through a hole such that the two elements pivotally coupled together can rotate relative to each other. This assembly allows to drive the mounting fixtures 140 in movement when the stroller frame 102 is collapsed.

Figure 4:
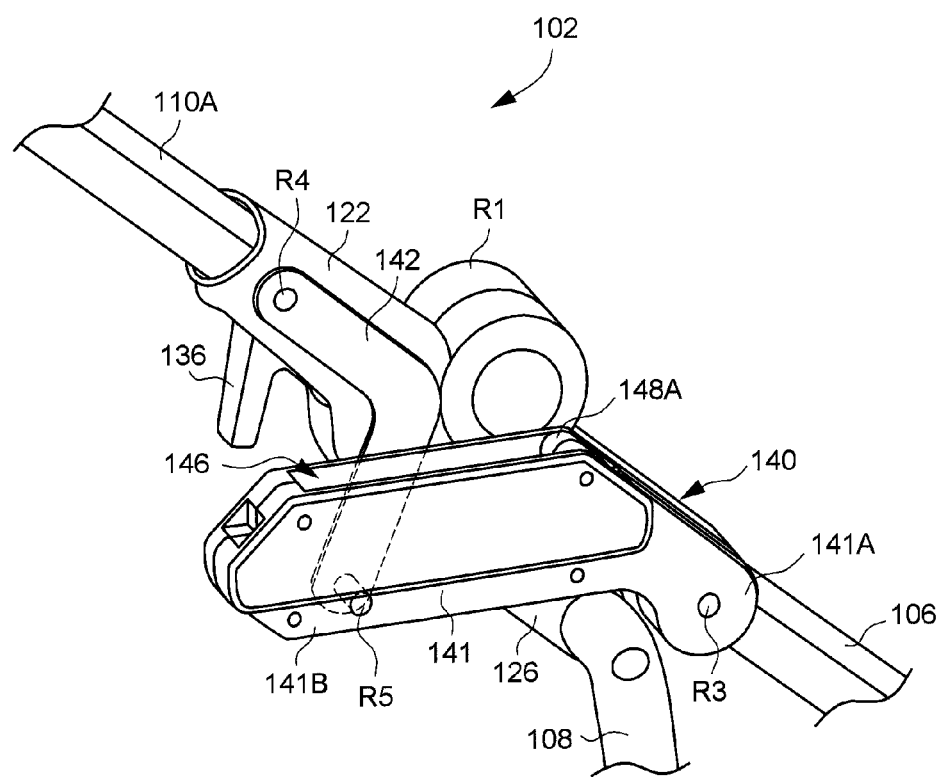
FIG. 4 is a perspective view illustrating in more details the construction of one mounting fixture of the stroller apparatus shown in FIG. 1.
Figure 5:
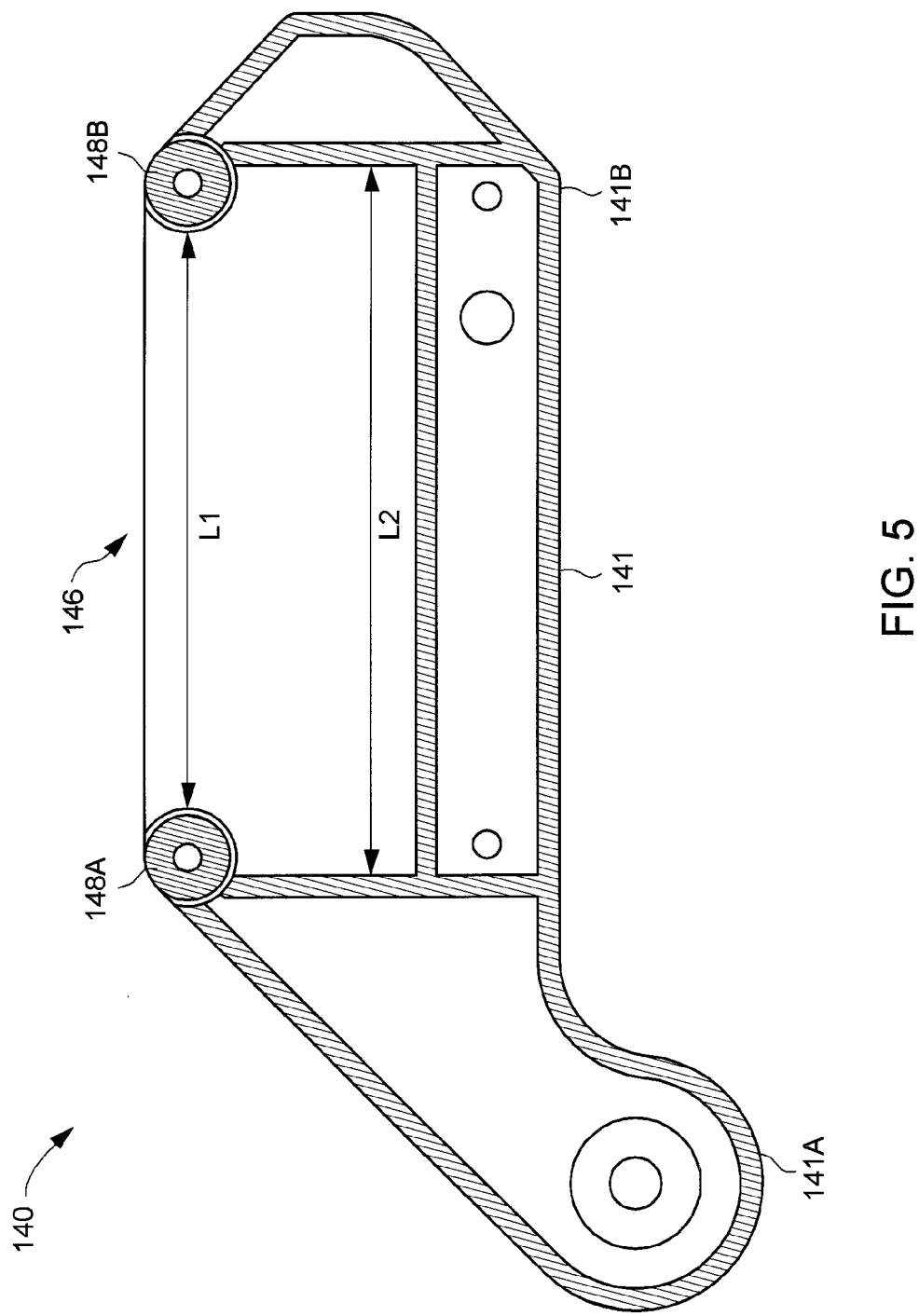
FIG. 5 is a cross-sectional view illustrating the mounting fixture shown in FIG. 4.

FIG. 4 is an enlarged view illustrating the assembly of one mounting fixture 140 on the stroller frame 102, and FIG. 5 is a cross-sectional view illustrating the housing 141 of one mounting fixture 140. As shown, the housing 141 of the mounting fixture 140 has an elongated shape with an upper surface and a lower surface. The upper surface of the mounting fixture 140 is opened to form an elongated slot 146. First and catching structures 148A and 148B are symmetrically provided at a two opposite inner sides (e.g., at the front and rear) of the slot 146, such that an upper portion of the slot 146 has a length L1 that is shorter than a length L2 of a lower portion of the slot 146. In one embodiment, the first and second catching structures 148A and 148B can be formed as rounded protuberances respectively provided adjacent to two opposite inner sides of the upper rim of the slot 146. As described hereafter, the catching structures 148A and 148B of each mounting fixture 140 can engage with abutting portions of a connector provided on the child support accessory, such that the child support accessory can be locked in position with the stroller frame 102.

In conjunction with FIG. 2, FIGS. 6 through 8 are schematic views illustrating intermediary stages in a method of folding the stroller frame 102 from a deployed state to a collapsed state. In FIG. 2, the stroller frame 102 is shown in a deployed state for use. In the deployed state, the first and second legs 106 and 108 are erected in a standing position from the base 104. Each of the handle side sections 110A and corresponding first leg 106 extend substantially along a same inclined direction, the pivot link R1 being located adjacent to the upper surface of the mounting fixture 140 on the left and right sides of the stroller frame 102. The fourth pivot link R4 is located opposite the third pivot link R3 relative to the position of the first pivot link R1. Each of the mounting fixtures 140 is held in a position that has the slot 146 lying along a generally horizontal direction, and the fifth pivot link R5 located below the first pivot link R1 and between the pivot links R3 and R4 along a vertical direction. As the second legs 108 are in a standing position behind the first legs 106, each of the associated second pivot link R2 is located in an area between the third and fifth pivot link R3 and R5, and the second pivot link R2 is located closer to the third pivot link R3 than the fifth pivot link R5. In addition, the extension 126 of each first coupling element 122 lies approximately parallel and adjacent to the upper end portion 106B of the first leg 106 on the left and right sides of the stroller frame 102.

Figure 6:
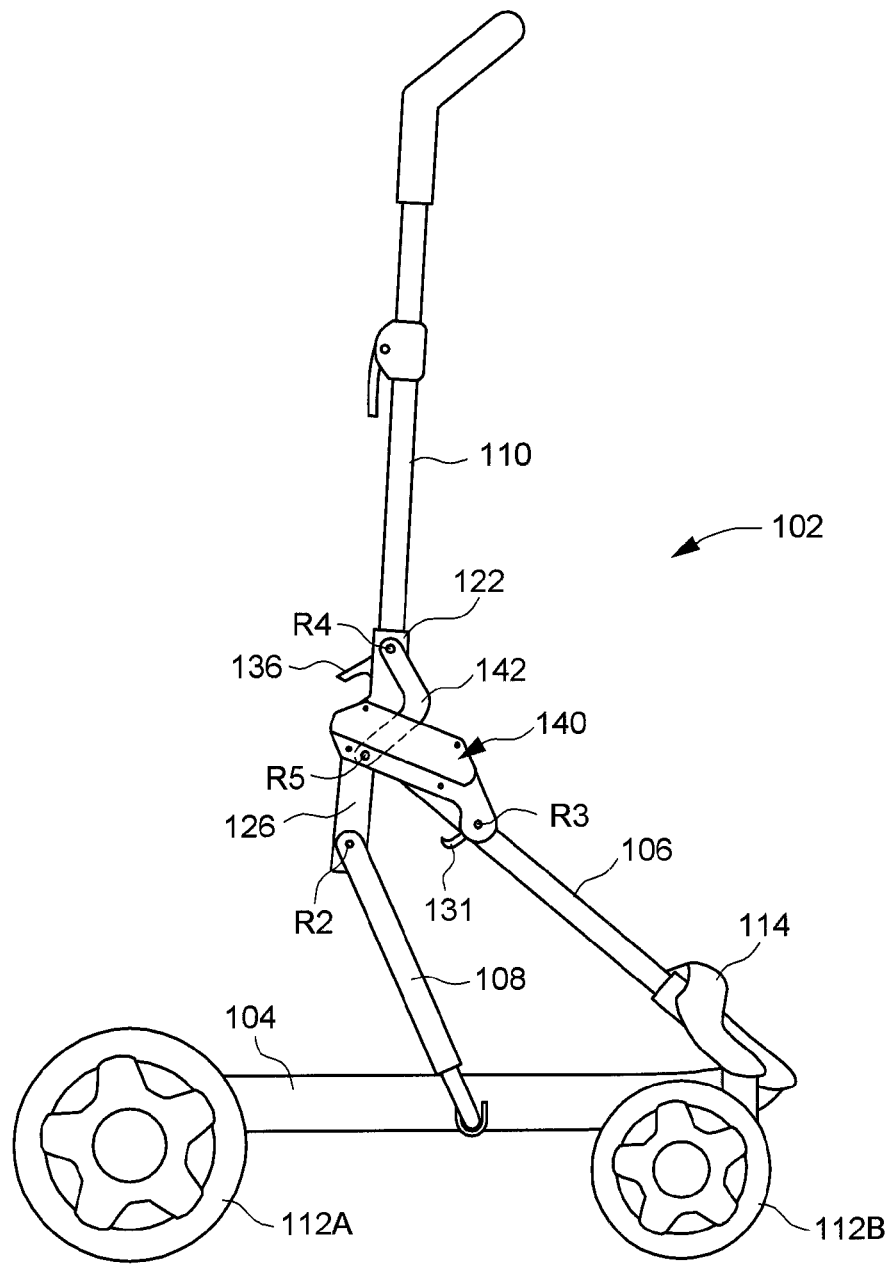
FIGS. 6 through 8 are schematic views illustrating intermediary stages in a method of collapsing the stroller apparatus shown in FIG. 1.
Figure 7:
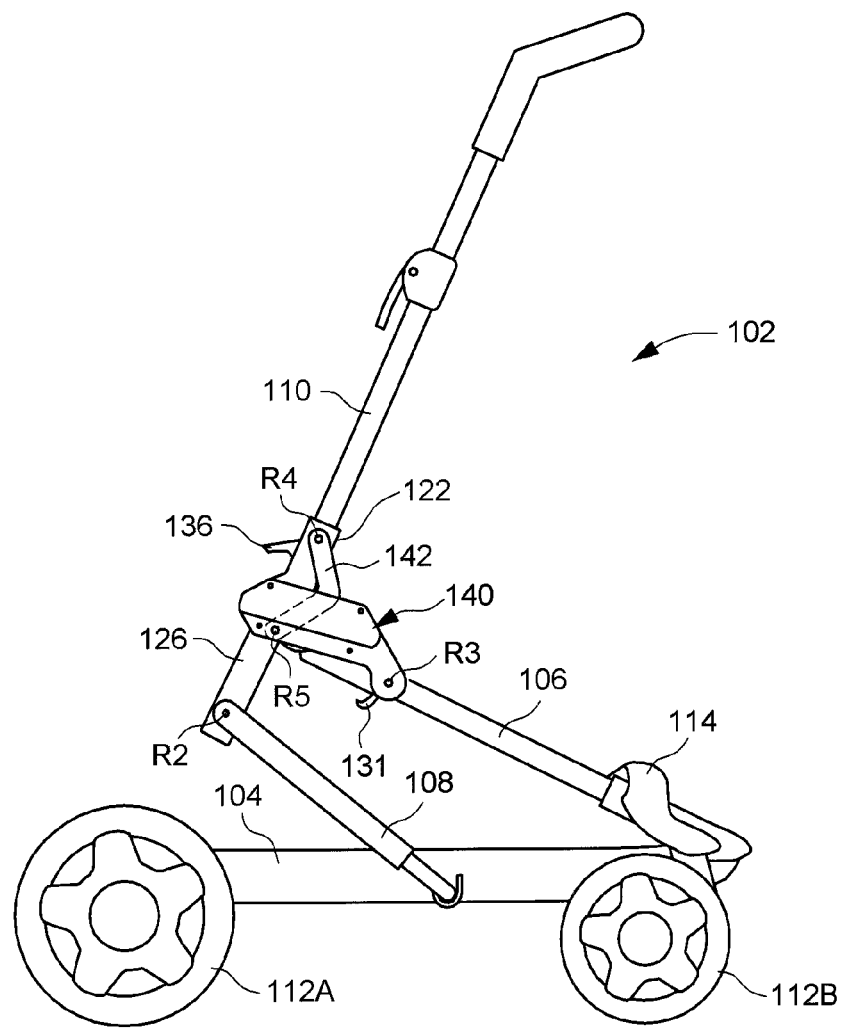
Figure 8:
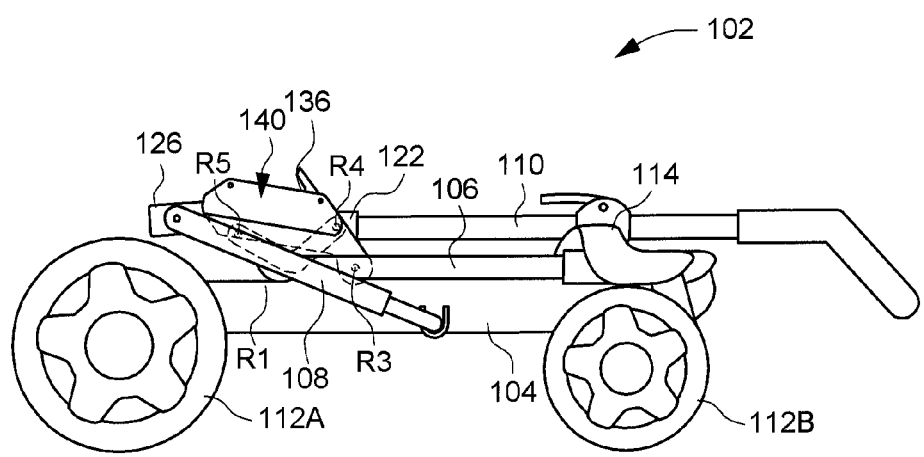

In order to collapse the stroller apparatus 100, the slider latch 132 first is disengaged from the hook element 131 by actuating the release handle 136 (FIG. 3). Then, as shown in FIGS. 6 through 8, the handle 110 can be turned forward about the first pivot link R1 and at the same time displaced downward. As a result, the first legs 106 and second legs 108 are driven in rotation to collapse toward the rear of the base 104, whereas the handle 110 is folded over the first legs 106 toward the front of the base 104. As the handle 110 collapses downward and forward, the mounting fixtures 140 are also displaced downward and rotated relative to the first legs 106 and the handle 110. However, the positional adjustment of the mounting fixtures 140 is such that the slots 146 can generally keep their upward orientation for avoiding collision between the child support accessory (not shown) against other moving elements of the stroller frame 102.

Once the stroller frame 102 is completely collapsed, the first and second legs 106 and 108 are folded generally parallel over the base 104, and the handle 110 is folded generally parallel over the first legs 106 such that the third and fourth pivot links R3 and R4 are located on a same side relative to the first pivot link R1. Moreover, the second pivot link R2 coupling the second leg 108 with the extension 126 (i.e., movably dependent from the handle 110) is displaced rearward of the fifth pivot link R5 coupling the link arm 142 with the rear of the mounting fixture 140. In the collapsed state, the slot 146 of the mounting fixture 140 on the left and right side also lies in a direction generally parallel to the first legs 106 and oriented generally upward, whereas the first pivot link R1 (located adjacent to the upper surface of the mounting fixture 140 in the deployed state) is displaced to a position adjacent to the lower surface of the mounting fixture 141. This arrangement can reduce the size of the stroller frame 102, allowing its convenient storage. Moreover, as detailed hereafter, the position and orientation of the mounting fixtures 140 enables the placement of the child support accessory in a position that does not interfere with the collapsing operation of the stroller frame 102. Accordingly, there is no need to remove the child support accessory for collapsing the stroller frame 102.

Figure 9:
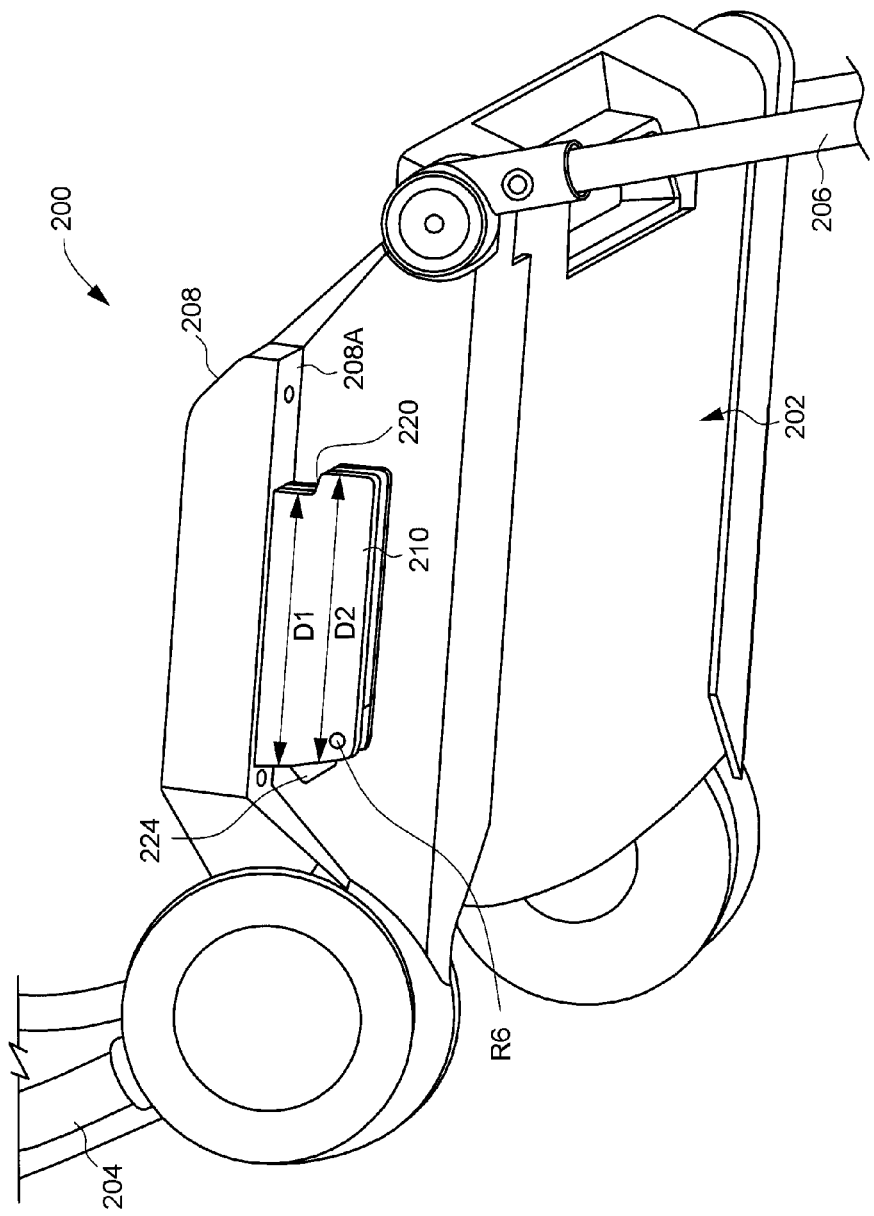
FIG. 9 is a schematic view illustrating an example of a child support accessory embodied as a detachable stroller seat module that can be attached on the stroller apparatus shown in FIG. 1.

As described previously, the mounting fixtures 140 can be used for installing a variety of child support accessories on the stroller frame 102. FIG. 9 is a schematic view illustrating an example of a child support accessory embodied as a detachable stroller seat module 200. As shown, the construction of the stroller seat module 200 can comprise a seat 202, a backrest frame 204 pivotally coupled with a rear of the seat 202, and a footrest frame 206 pivotally coupled with a front end of the seat 202. Left and right sides of the seat 202 can include vertically raised portions 208 that form two armrests of the seat 202. Each of the raised portions 208 can include a lateral extension 208A below which is affixed a connector 210. When the stroller seat module 200 is to be installed on the stroller frame 102, the two connectors 210 on the left and right sides of the stroller seat module 200 can respectively engage and lock with the two mounting fixtures 140 for holding the stroller seat module 200 on the stroller frame 102.

Figure 10:
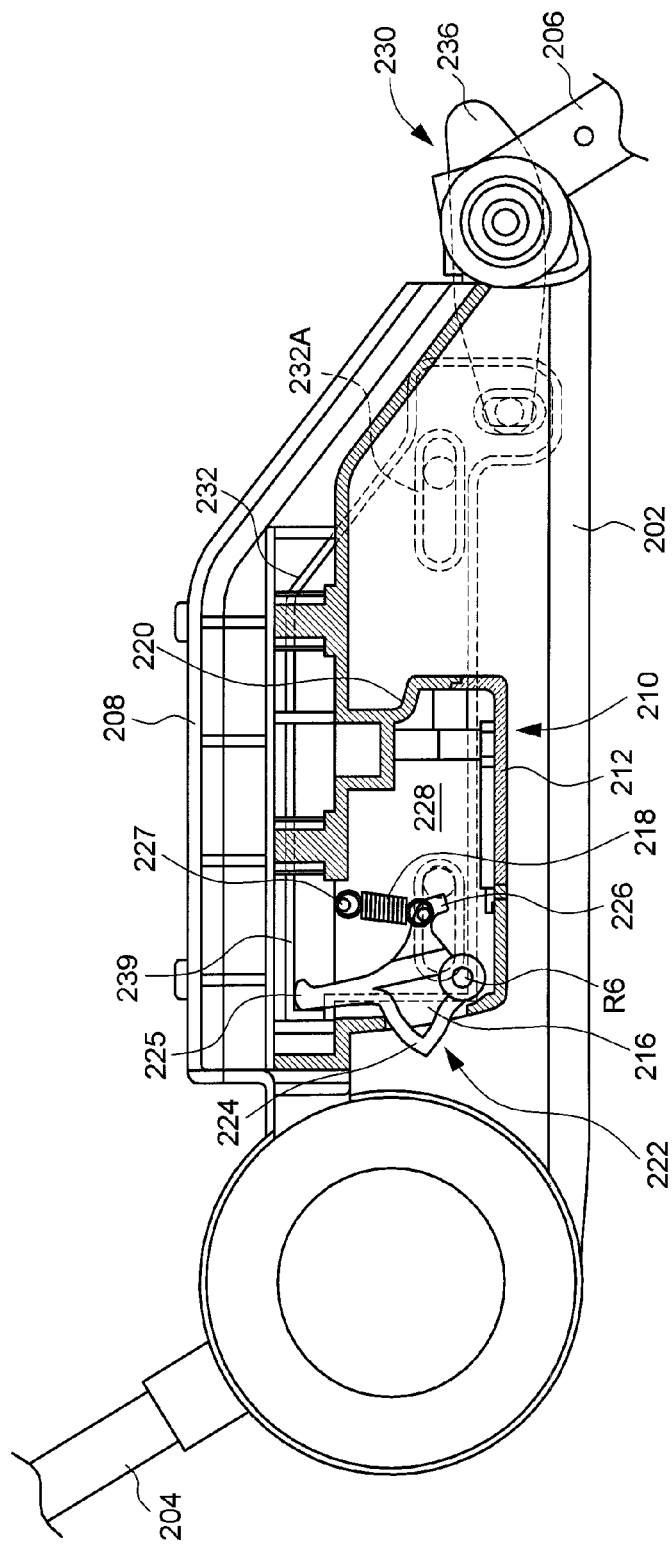
FIG. 10 is a partial cross-sectional view illustrating the construction of one connector shown in FIG. 9.

In conjunction with FIG. 9, FIG. 10 is a cross-sectional view illustrating the construction of one connector 210. The connector 210 can include a casing 212 having an elongated shape, a latch 216 and a spring element 218. The casing 212 can have an upper portion of a first length D1, and a lower portion of a second length D2 longer than the first length D1. The elongated shape of the casing 212 can have a first end provided with a first abutting portion 220, and an opposite second end including an opening 222 that communicates with an interior of the casing 212. In one embodiment, the first abutting portion 220 can be formed from the first end surface of the casing 212 as a shoulder.

As shown, the latch 216 is mounted in the casing 212 about a pivot link R6. In one embodiment, the pivot axis of the pivot link R6 can be approximately parallel to the width of the stroller seat module 200 and the pivot axes of the pivot links R1 to R5. The latch 216 can be formed in a single body including a second abutting portion 224, an extension arm 225 and a prong 226 that are respectively disposed at different radial directions relative to the axis of the pivot link R6. When the latch 216 rotates about the pivot link R6 relative to the casing 212, the second abutting portion 224 can either protrude out of the opening 222 at a position longitudinally opposite the first abutting portion 220, or retract into the casing 212.

Referring again to FIG. 10, the spring element 218 can be respectively coupled with the prong 226 of the latch 216 and an anchor 227 affixed on an inner sidewall 228. In one embodiment, the spring element 218 can be an extension spring adapted to bias the latch 216 in a direction for causing the second abutting portion 224 to extend out of the opening 222. Accordingly, the connector 210 has a fixed first abutting portion 220 and a movable second abutting portion 224 adapted to engage with the first and second catching structures 148A and 148B of the mounting fixture 140. The mounting system comprised of the mounting fixture 140 and the connector 210 can be used for locking the child seat module 200 with the stroller frame 102.

Figure 11:
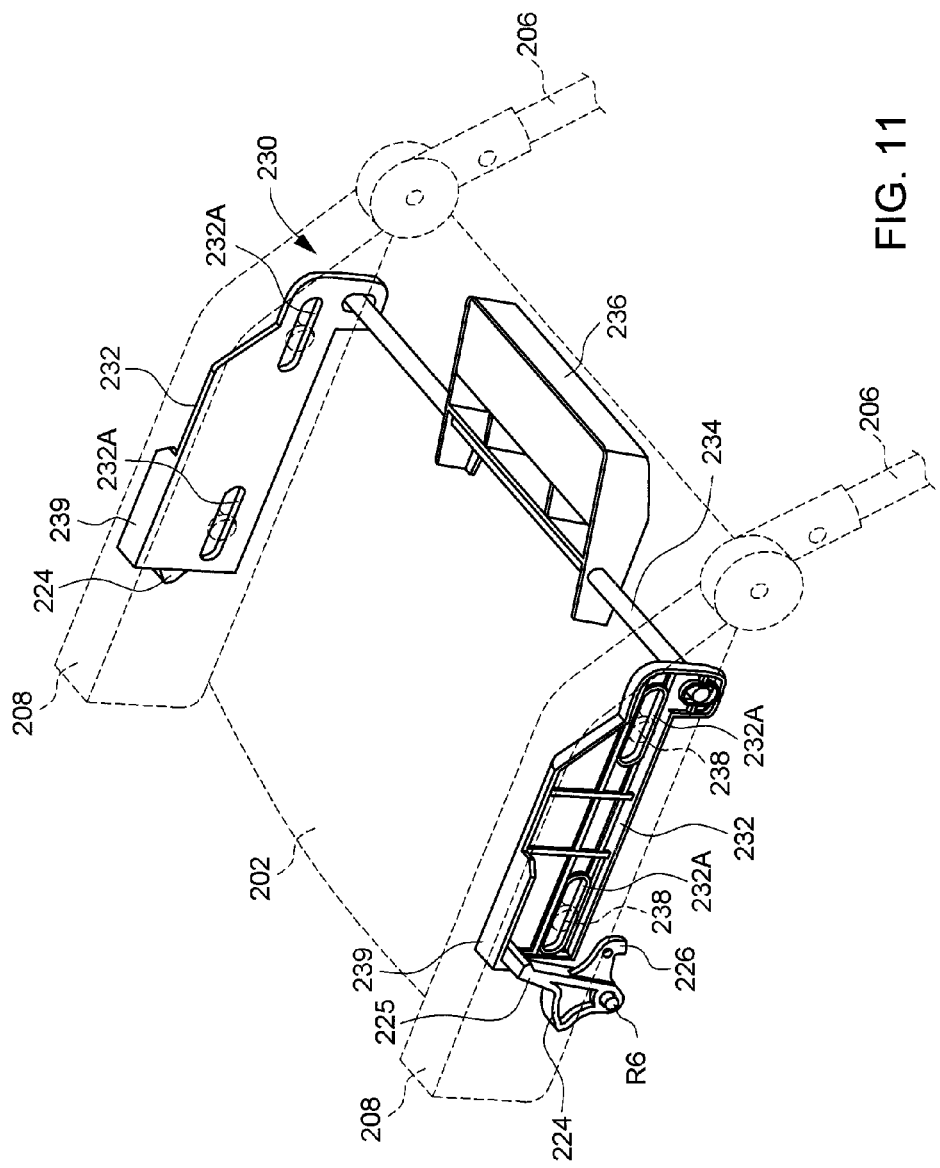
FIG. 11 is a schematic view illustrating in more details the connection between the actuator mechanism and the latch provided on the left and right sides of the seat.

In order to operatively retract the second abutting portion 224 into the casing 212, an actuator mechanism 230 can be connected with the extension arm 225 of the latch 216. In conjunction with FIG. 10, FIG. 11 is a schematic view illustrating in more details the construction of the actuator mechanism 230. The actuator mechanism 230 can include two coupling plates 232, a transversal rod 234 and a release handle 236. Each of the coupling plates 232 is respectively connected with the latch 216 on the left and right sides of the stroller seat module 200. In one embodiment, each of the coupling plates 232 can be placed in a hollow interior of each raised portion 208, and is separated from an inner side of the associated latch 216 via the inner sidewall 228. Each of the coupling plates 232 can lie generally parallel to the length of the connector 210, and extends toward the front of the stroller seat module 200. Elongated guide slots 232A can be provided in each coupling plate 232 through which pins 238, protruding from the inner sidewall 228, are respectively engaged for guiding back and forth movements of the coupling plate 232. A rear of each of the coupling plates 232 also includes a flange 239 that extends over the associated latch 216 and engages with its extension arm 225. The engagement between the flange 239 and the extension arm 225 can couple the sliding movements of the coupling plate 232 with the rotation of the latch 216 on the left and right sides of the seat 202.

As shown in FIG. 11, the transversal rod 234 extends across the width of the seat 202 and between the two opposing coupling plates 232. The two opposite ends of the transversal rod 234 are respectively connected with the front of the coupling plates 232 on the left and right sides of the seat 202. The release handle 236 can be affixed with a middle portion of the transversal rod 234 at a front position of the seat 202. The release handle 236 can be operated for concurrently driving translational movements of the coupling plates 232, which in turn cause the latches 216 to rotate for retracting the second abutting portions 224 inside the casing 212 of the connectors 210.

Figure 12:
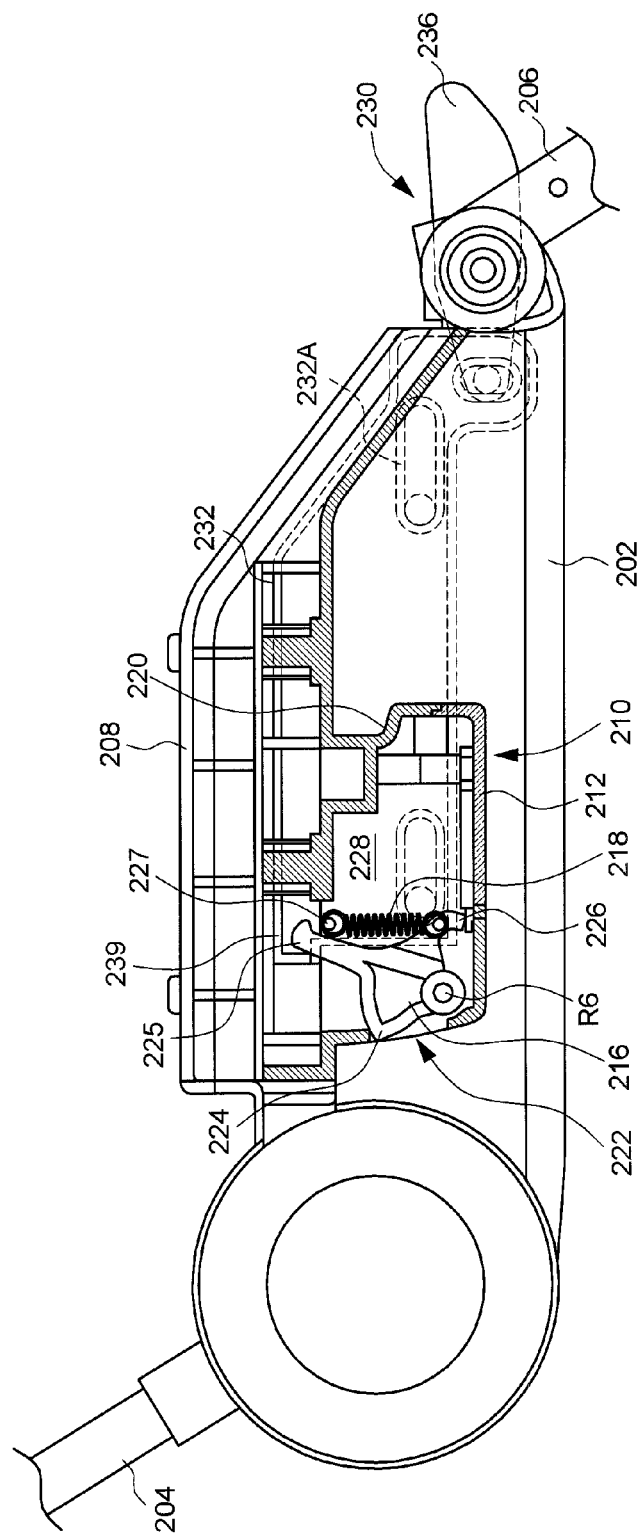
FIG. 12 is a partial cross-sectional view illustrating the operation of the actuator mechanism shown in FIG. 11.

FIG. 12 is a cross-sectional view illustrating the operation of the actuator mechanism 230. When the release handle 236 is pulled forward, the coupling plates 234 are driven in translational movement to cause the latches 216 on the left and right sides to rotate for driving the second abutting portions 224 to retract toward the interior of the casing 212 and load the spring elements 218. Once the pulling action on the release handle 236 is released, the spring elements 218 can bias the associated latches 216 in a reverse direction for driving the second abutting portions 224 to protrude out of the respective openings 222 and recover the configuration shown in FIG. 10. As the latches 216 driven by the spring elements 218 rotate in the reverse direction, the coupling plates 232 are also driven in translational movement toward the rear of the stroller seat module 200 and recover the positions shown in FIG. 10.

It is worth noting that various embodiments of the aforementioned design can be possible. For example, the positions of the first and second abutting portions 220 and 224 of the connector 210 can be interchanged. In alternate embodiments, both of the first and second abutting portions can also be designed movable.

In conjunction with FIGS. 10 and 11, FIGS. 13 and 14 are schematic views illustrating how the stroller seat module 200 can be installed on the stroller frame 102 in a rearward facing configuration (i.e., the front of the stroller seat module 200 facing the rear of the stroller apparatus 100). As the second length D2 at the lower portion of the connector 210 is longer than the length L1 at the upper portion of the slot 146, the connector 210 cannot be directly inserted into the slot 146 in a parallel manner. Therefore, the stroller seat module 200 must be initially placed such that the first abutting portion 220 of the connector 210 on the left and right sides of the stroller seat module 200 respectively contacts with or lies adjacent to the second catching structure 148B of the mounting fixture 140 on the left and right sides of the stroller frame 102. The stroller seat module 200 can be then rotated about the second catching structure 148B for inserting the connectors 210 into the slots 146 of the mounting fixtures 140. As the stroller seat module 200 rotates and the connectors 210 insert into the respective mounting fixtures 140, the second abutting portion 224 of each latch 216 can be pushed against the corresponding first catching structure 148A and retract into the casing 212, causing loading of the spring element 218. Once the connector 210 on the left and right sides of the stroller seat module 200 is fully inserted in the corresponding mounting fixture 140, the spring element 218 can drive reverse rotation of the latch 216 such that the second abutting portion 224 extends out of the casing 212 and engages with the first catching structure 148A. As a result, the first and second abutting portions 220 and 224 on opposite sides of each connector 210 can respectively engage with the second and first catching structures 148B and 148A of the mounting fixture 140 for locking the connector 210 in the mounting fixture 140. Accordingly, the stroller seat module 200 can be securely held and locked in place on the stroller frame 102.

Referring again to FIGS. 13 and 14, when a user wants to detach the stroller seat module 200 from the stroller frame 102, the actuator mechanism 230 can be operated by pulling the release handle 236 forward. As a result, the coupling plate 232 on the left and right sides respectively slides forward and pulls the associated latch 216 to rotate in a direction for retracting the second abutting portion 224 toward the interior of the connector 210 and stretching the spring element 218. As the obstruction of the second abutting portion 224 against the first catching structure 148A at the front of the mounting fixture 140 is removed, the rear of the stroller seat module 200 can be rotated upward about the second catching structure 148B at the rear of the mounting fixtures 140. Once the rear of the connector 210 is entirely disengaged from the slot 146 of the mounting fixture 140, the stroller seat module 200 can be pulled upward to remove entirely the connector 210 from the mounting fixture 140 for detaching the stroller seat module 200 from the stroller frame 102.

Figure 13:
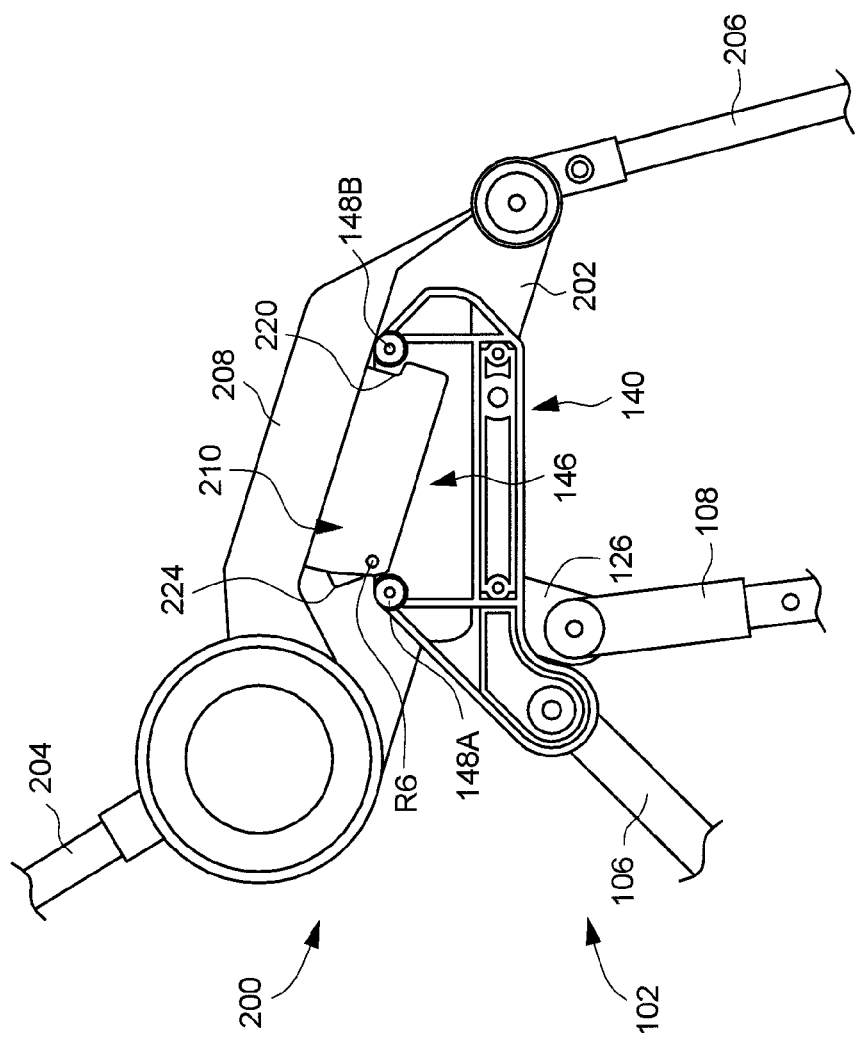
FIGS. 13 and 14 are schematic views illustrating how the stroller seat module can be installed on the stroller frame in a rearward facing configuration.
Figure 14:
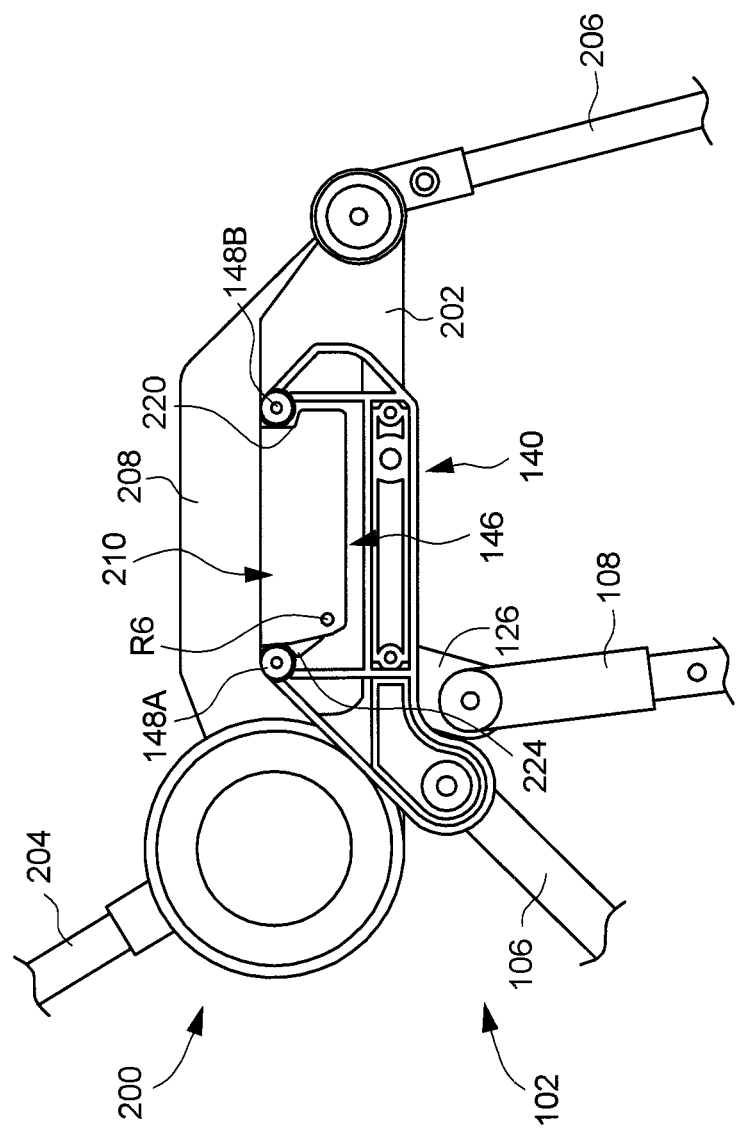

While the stroller seat module 200 is shown installed in a rearward facing configuration in FIGS. 13 and 14, it is worth noting that the symmetrical construction of the catching structures 148A and 148B and abutting portions 220 and 224 also enables to install the stroller seat module 200 on the stroller frame 102 in a forward facing configuration (i.e., the front of the stroller seat module 200 facing the rear of the stroller apparatus 100).

Figure 15:
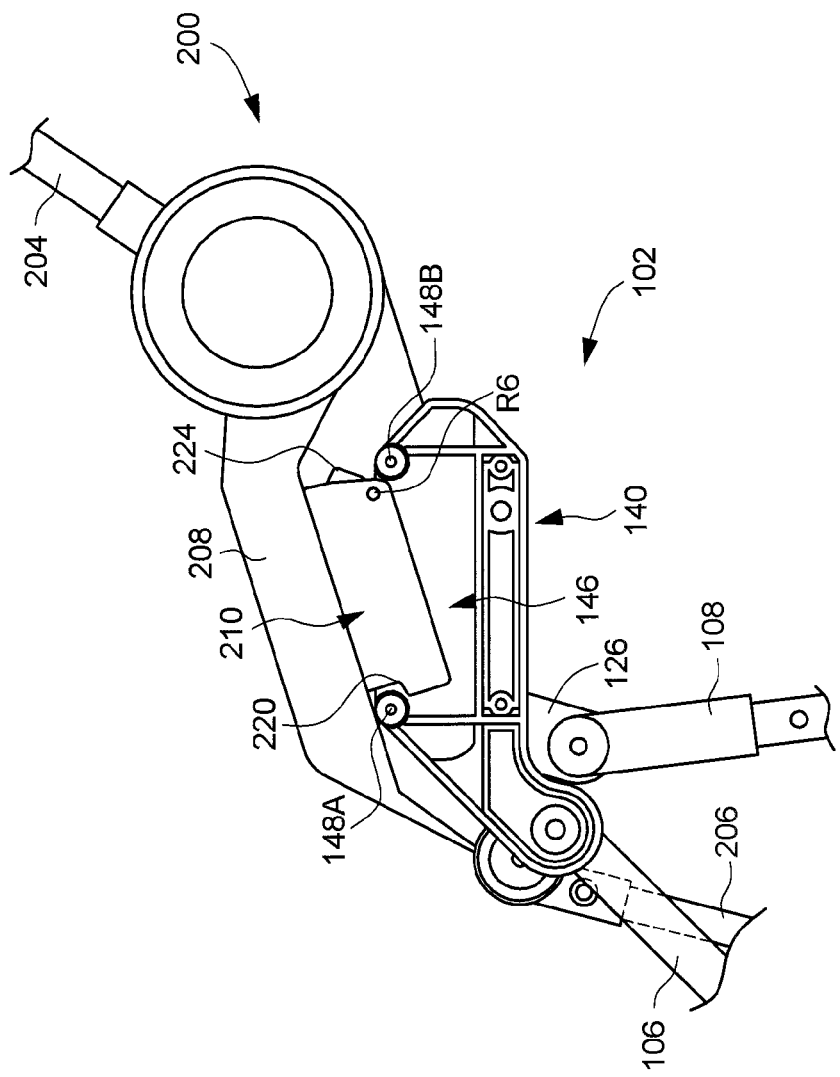
FIGS. 15 and 16 are schematic views illustrating how the stroller seat module can be installed on the stroller frame in a forward facing configuration.
Figure 16:
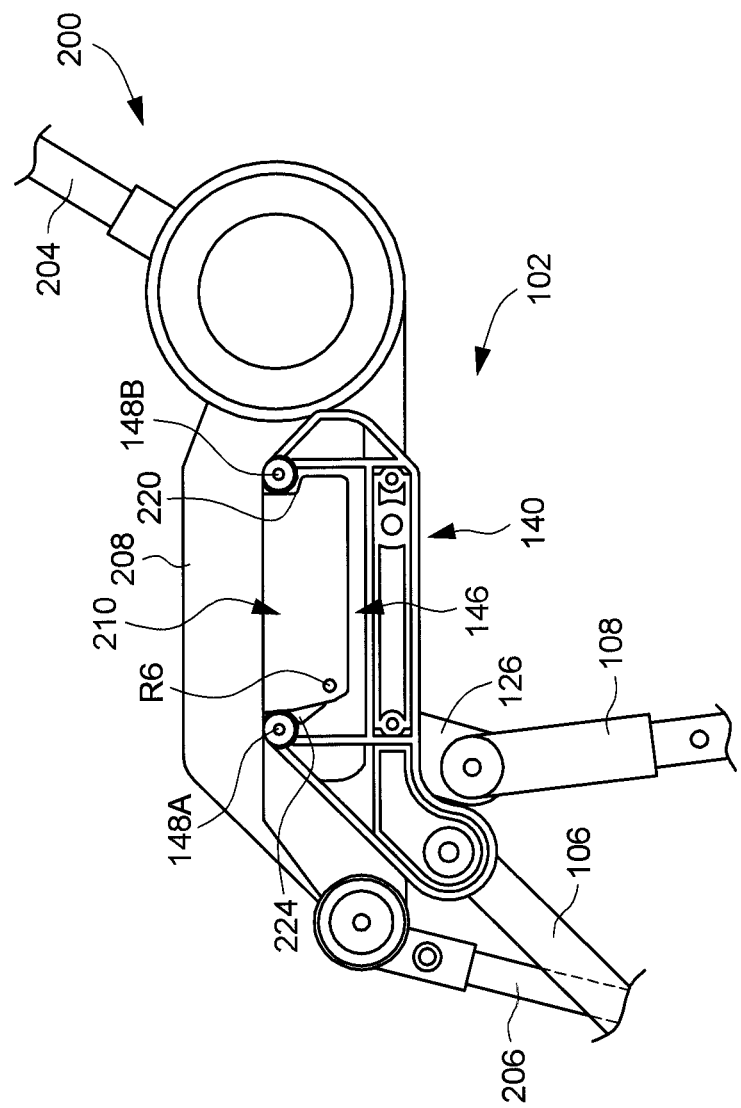

FIGS. 15 and 16 are schematic views illustrating how the stroller seat module 200 can be installed on the stroller apparatus 100 in a forward facing configuration. Initially, the stroller seat module 200 can be placed such that the first abutting portion 220 of the connector 210 on the left and right sides of the stroller seat module 200 respectively contacts with or lies adjacent to the first catching structure 148A of the mounting fixture 140 on the left and right sides of the stroller frame 102. The stroller seat module 200 can be then rotated about the first catching structure 148A for inserting the connectors 210 into the slots 146 of the mounting fixtures 140. As the stroller seat module 200 rotates and the connectors 210 insert into the respective mounting fixtures 140, the second abutting portion 224 can be pushed against the corresponding second catching structure 148B and retract into the casing 212, causing loading of the spring element 218. Once the connector 210 on the left and right sides of the stroller seat module 200 is fully inserted in the corresponding mounting fixture 140, the spring element 218 can drive reverse rotation of the latch 216 such that the second abutting portion 224 extends out of the casing 212 and engages with the second catching structure 148B. As a result, the first and second abutting portions 220 and 224 on opposite sides of each connector 210 can respectively engage with the first and second catching structures 148A and 148B of the mounting fixture 140 for locking the connector 210 in the mounting fixture 140. Accordingly, the stroller seat module 200 can be securely held and locked in place on the stroller frame 102.

Figure 17:
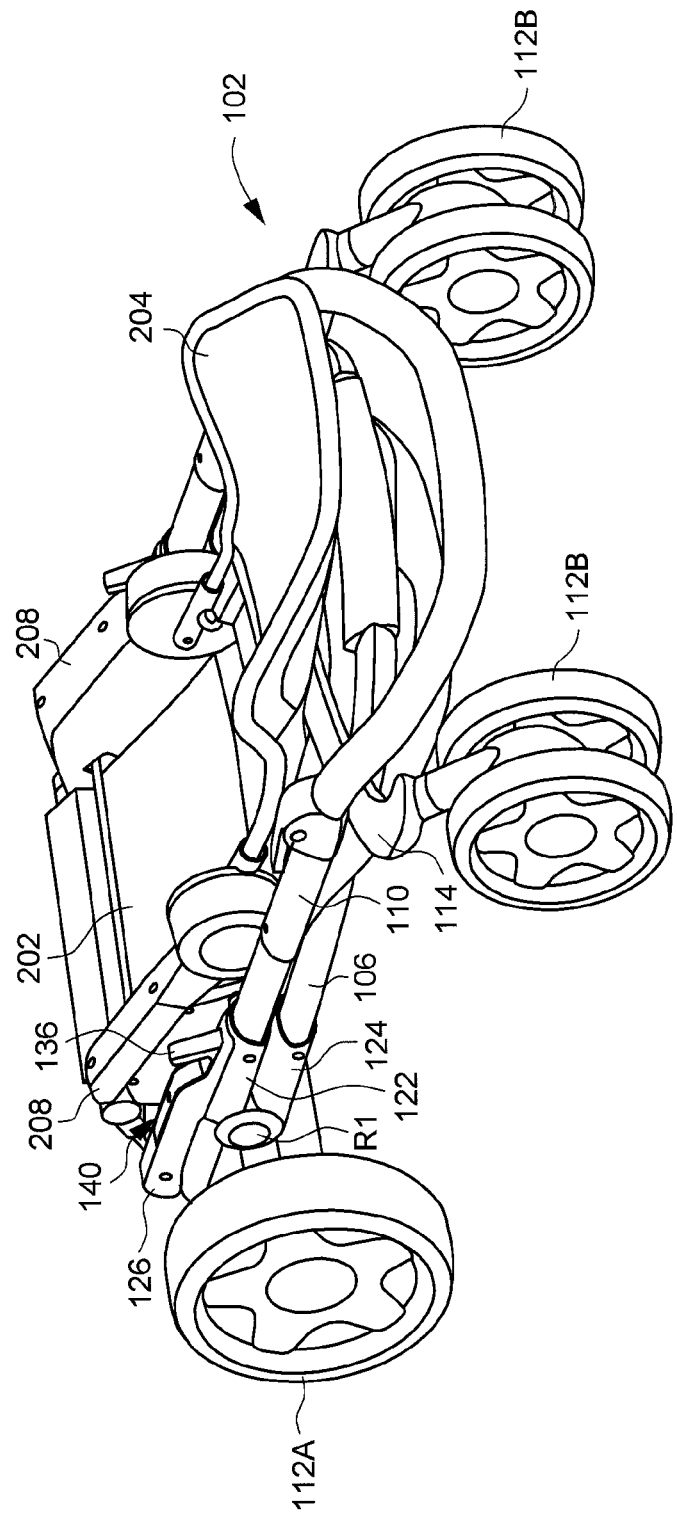
FIG. 17 is a schematic view illustrating the stroller frame in a collapsed state and provided with the stroller seat module mounted in a rearward facing configuration.

It is worth noting that the stroller apparatus 100 can be equally collapsed regardless of whether the stroller seat module 200 is mounted on the stroller apparatus 100 in rearward or forward facing configurations. FIG. 17 is a schematic view illustrating the stroller apparatus 100 in a collapsed state and provided with the stroller seat module 200 mounted in a rearward facing configuration. Once the stroller apparatus 100 is collapsed, the seat 202 of the stroller seat module 200 can be positioned between the handle side sections 110A and in a region between the rear wheels 112A, the upper surface of the seat 202 being exposed upward. Meanwhile, the backrest 204 can be rotated toward the rear of the seat 202 (corresponding to the front of the stroller apparatus 100) so as to lie in a region between the front wheels 112B. The stroller seat module 200 can be thereby disposed generally parallel to the base 104 in a compact manner.

Figure 18:
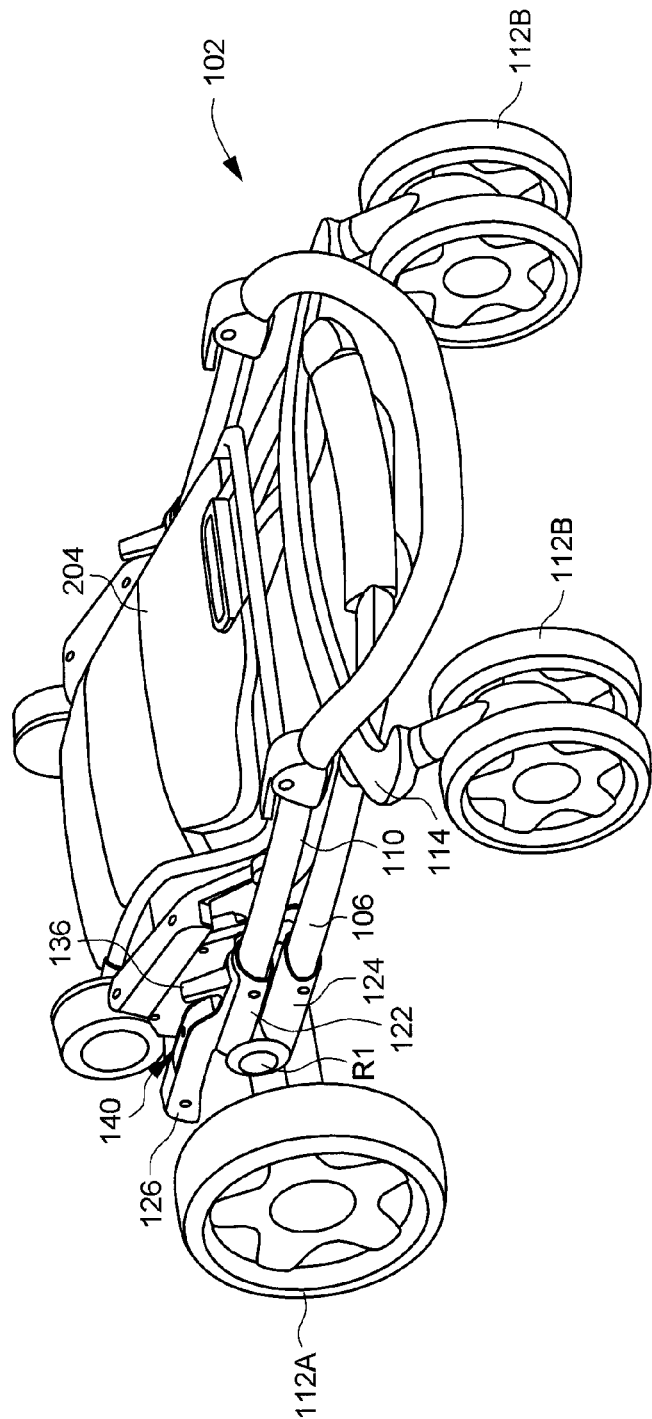
FIG. 18 is a schematic view illustrating the stroller frame in a collapsed state and provided with the stroller seat module mounted in a forward facing configuration.

FIG. 18 is a schematic view illustrating the stroller apparatus 100 in a collapsed state and provided with the stroller seat module 200 mounted in a forward facing configuration. Once the stroller apparatus 100 is collapsed, the seat 202 of the stroller seat module 200 can be positioned between the handle side sections 110A of the handle 110 and in a region between the rear wheels 112A. Meanwhile, the backrest 204 can be folded over the seat 202 toward the front of the seat 202 and stroller apparatus 100 so as to lie in a region between the front wheels 112B. The stroller seat module 200 can be thereby disposed generally parallel to the base 104 in a compact manner.

Figure 19:
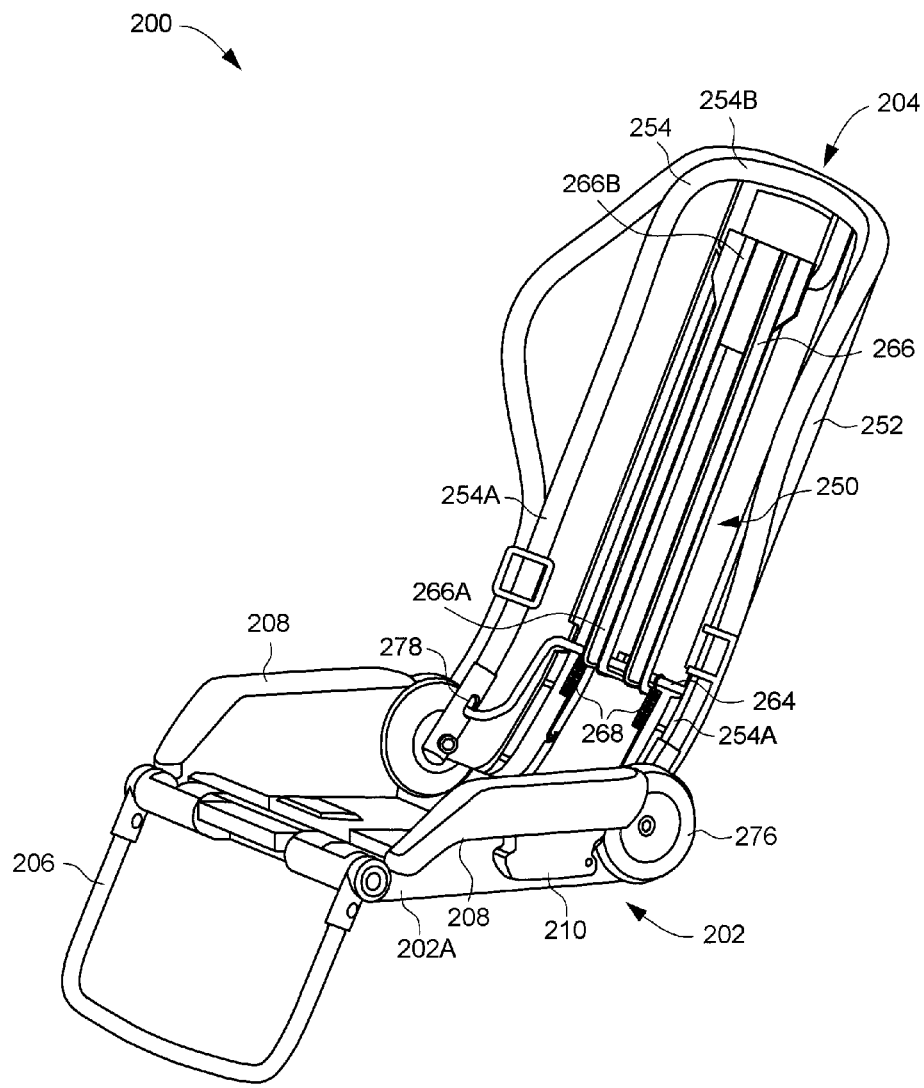
FIG. 19 is a schematic view illustrating one embodiment of a stroller seat module provided with a backrest adjustment mechanism.
Figure 20:
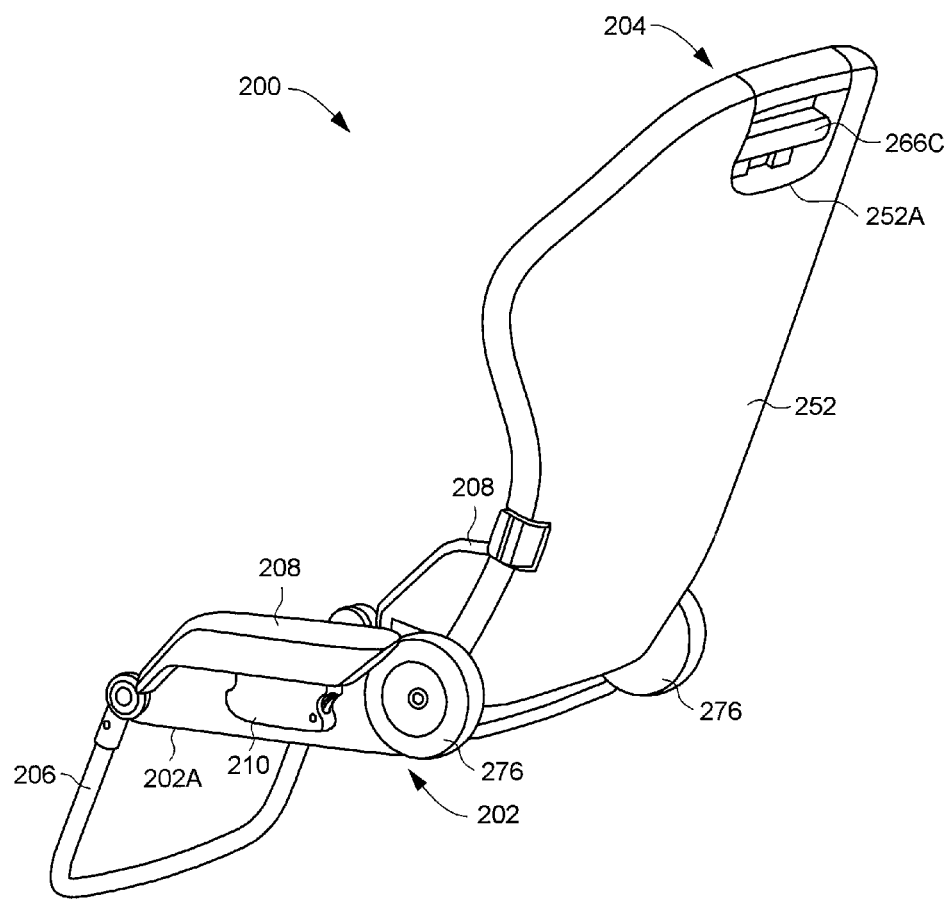
FIG. 20 is a rear perspective view of the stroller seat module shown in FIG. 19.
Figure 21:
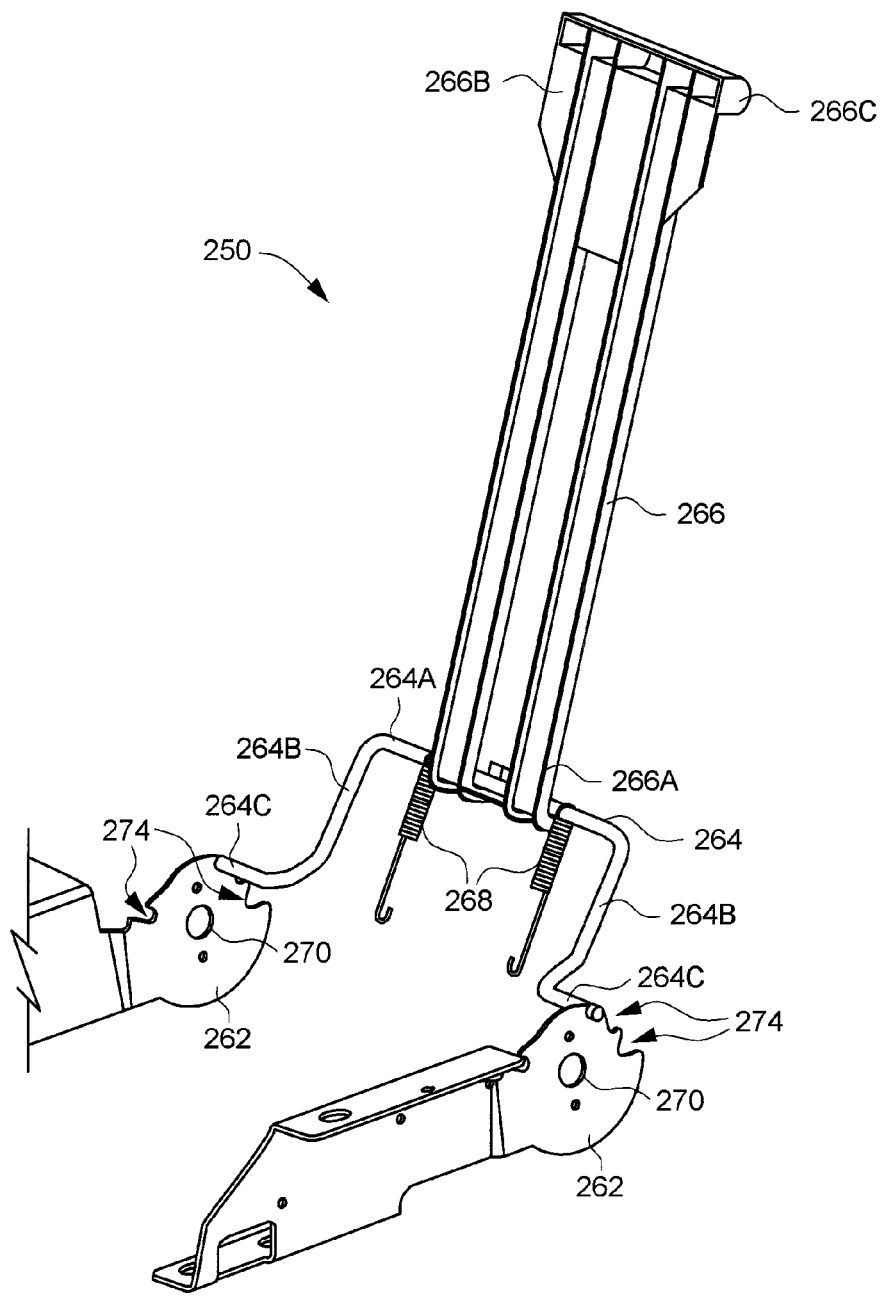
FIG. 21 is schematic view illustrating the backrest adjustment mechanism shown in FIG. 19.

To allow convenient adjustment of the backrest 204, the stroller seat module 200 can include an adjusting mechanism adapted to permit rotation of the backrest 204 and hold it at different positions. FIGS. 19-21 are schematic views illustrating one embodiment of a backrest adjustment mechanism 250 provided on the stroller seat module 200. As shown, the backrest 204 can include a rigid board 252 that is fixedly connected with a tubular frame 254. In one embodiment, the tubular frame 254 can have a generally U-shape including parallel left and right side segments 254A, and a transverse segment 254B joined between the side segments 254A. Lower or distal ends of the side segments 254A can be pivotally connected with the seat 202 toward the rear of the left and right raised portions 208.

Referring to FIGS. 19 and 21, the backrest adjustment mechanism 250 can include a holder base 262 respectively provided on the left and right sides of the seat 202, a latching element 264, a release actuator 266 and spring elements 268. Each of the holder bases 262 can be formed as a metal sheet respectively embedded in each of the left and right side portions of the seat shell 202A. The holder base 262 can have a central hole 270 through which a rivet, pin or like element may be engaged for pivotally connecting the corresponding side segment 254A of the tubular frame 254 with the seat shell 202A. A peripheral edge portion of the holder base 262 can include a plurality of locking grooves 274 distributed in different radial directions relative to the central hole 270. Any of the locking grooves 274 can be engaged by the latching element 264 for holding the backrest 204 at a desired position.

As shown in FIGS. 19 and 20, a housing 276 can respectively enclose each holder base 262 to prevent injury and undesirable interference during operation, such as accidental finger pinching and obstruction in the locking grooves 274.

Referring to FIGS. 19 and 21, the latching element 264 can be formed in a single body including a transverse segment 264A that extends across the width of the backrest 204, and symmetrical side segments 264B that are respectively joined with left and right side ends of the transverse segment 264A and terminate into outwardly bent extensions 264C. The latching element 264 can be assembled for translational movement along an inner side of the rigid board 252. Each of the extensions 264C can be movably assembled through an elongated slot 278 (FIG. 19) formed on each of the left and right side segments 254A of the tubular frame 254, and lie adjacent to the associated holder base 262. As the latching element 264 slides relative to the backrest 204, the extensions 264C can be driven to engage with any of the locking grooves 274 to hold the backrest 204 in position, or disengage from the locking grooves 274 to permit pivotal adjustment of the backrest 204.

Each of the spring elements 268 can have a first end connected with the transverse segment 264A of the latching element 264, and a second end anchored with the rigid board 252 of the backrest 204. The spring elements 268 can be operable to bias the latching element 264 to engage with the locking grooves 274.

Referring again to FIGS. 19-21, the release actuator 266 can be formed as an integral elongated piece including a first end 266A anchored with the transverse segment 264A of the latching element 264, and a distant second end 266B provided with a handle 266C. The release actuator 266 can be movably assembled with the rigid board 252 of the backrest 204, and the handle 266C can be disposed protruding outward through an opening 252A on the rear of the rigid board 252 (as shown in FIG. 20). When the handle 266C is grasped and pulled upward, the release actuator 266 can move relative to the backrest 204 to stretch the spring elements 268 and drive the latching element 264 to disengage from the holder bases 262. The backrest 204 can be thereby unlocked, and then rotated relative to the seat 202 for adjustment. Once the backrest 204 has reached the desired position, the spring elements 268 can urge the latching element 264 to engage with the holder bases 262 to hold and lock the backrest 204 in place.

FIGS. 22A through 25B are multiple schematic views illustrating various adjustment positions permitted by the backrest adjustment mechanism 250. It is understood that these adjustment positions are provided only for illustration, and more or less positions can be set according to the design requirement.

Figure 22A:
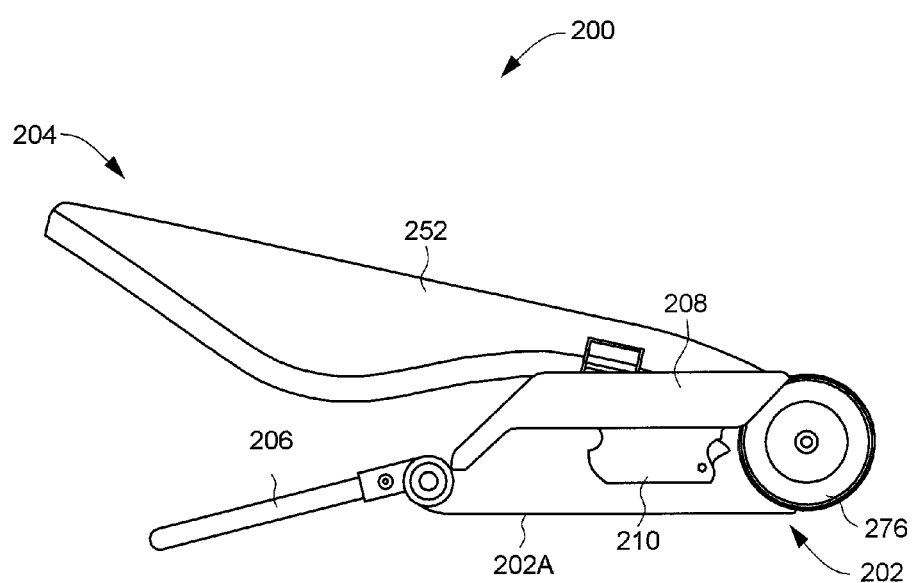
FIG. 22A is a schematic side view illustrating the stroller seat module shown in FIG. 19 with the backrest in a first position collapsed onto the seat.
Figure 22B:
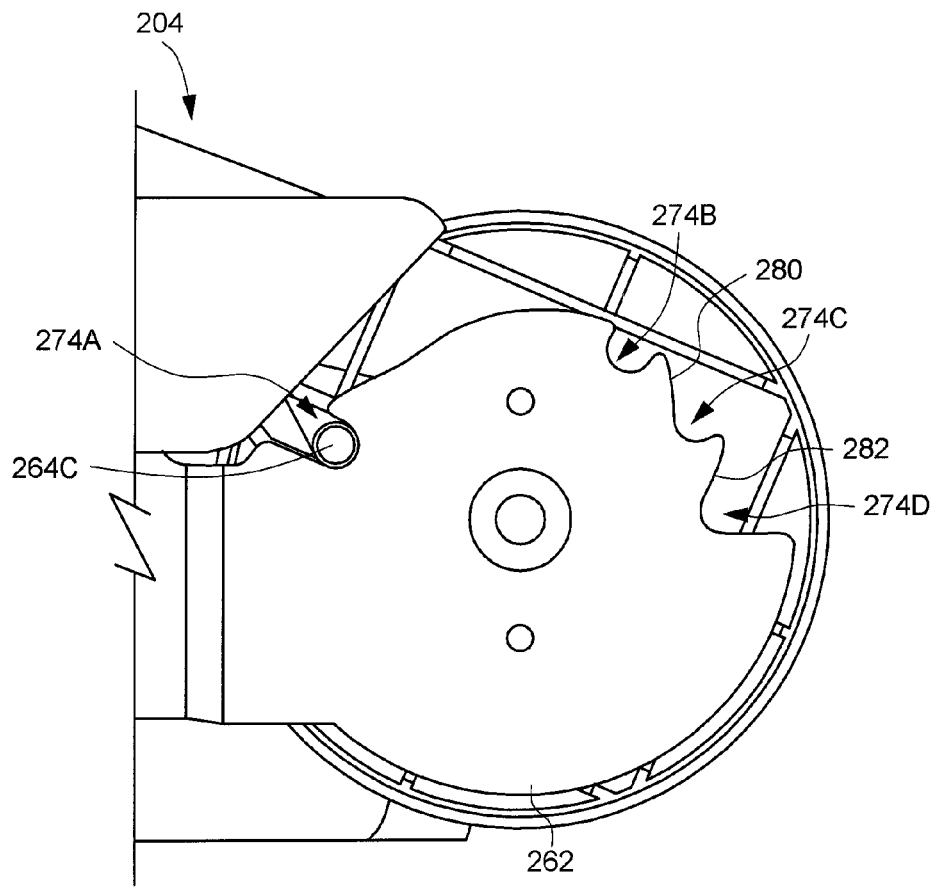
FIG. 22B is a schematic view illustrating the engagement between a latching element and a holder base for holding the backrest in the position shown in FIG. 22A.

FIG. 22A is a schematic side view illustrating a first position of the backrest 204 collapsed onto the seat 202, whereas FIG. 22B is a schematic view illustrating the engagement between the latching element 264 and the holder base 262 for holding the backrest 204 in the position shown in FIG. 22A. The backrest 204 can be typically collapsed to this configuration for facilitating storage (for example, such as shown in FIG. 18). In this position, each of the extensions 264C of the latching element 264 can engage with a first locking groove 274A of the corresponding holder base 262 that can block all rotation of the backrest 204 (i.e., in clockwise and anti-clockwise direction). To deploy the backrest 204 from the collapsed position, the release actuator 266 has to be operated to unlock the backrest 204.

Figure 23A:
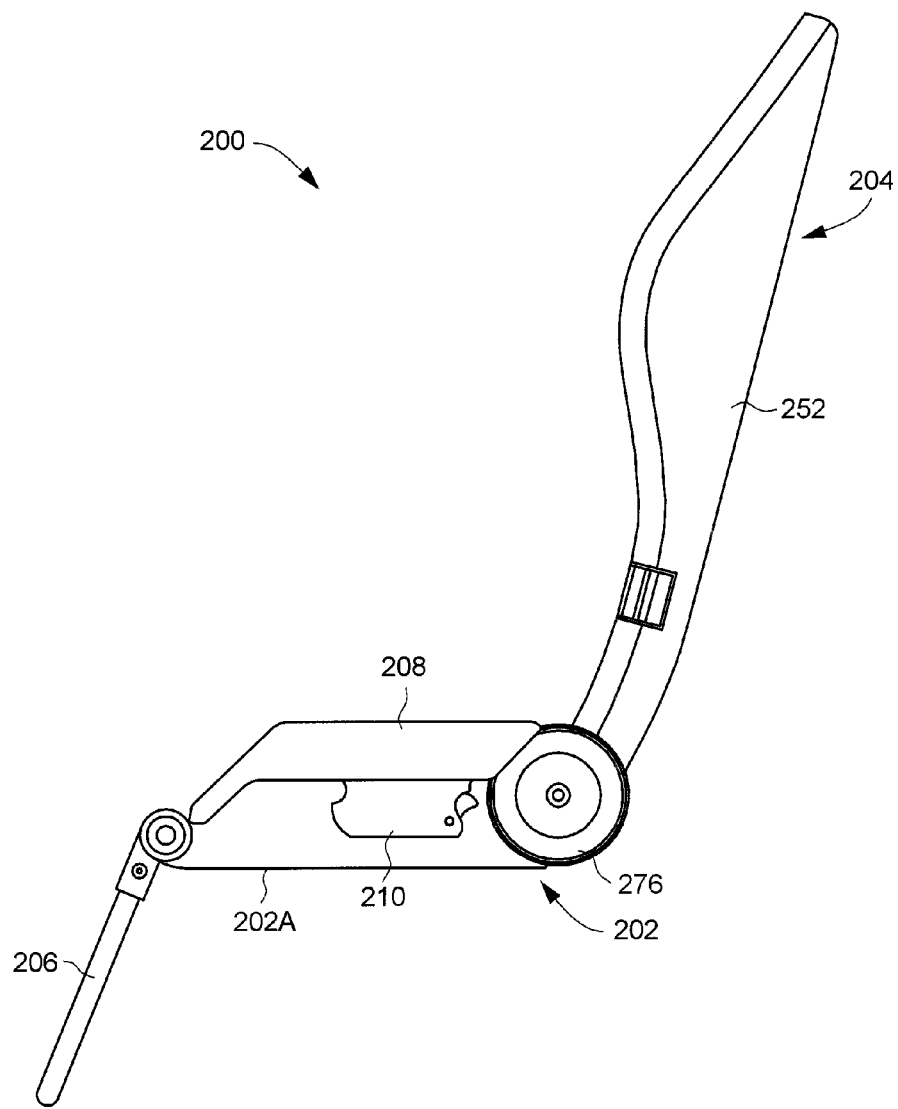
FIG. 23A is a schematic side view illustrating the stroller seat module shown in FIG. 19 with the backrest in a second position erected upward relative the seat.
Figure 23B:
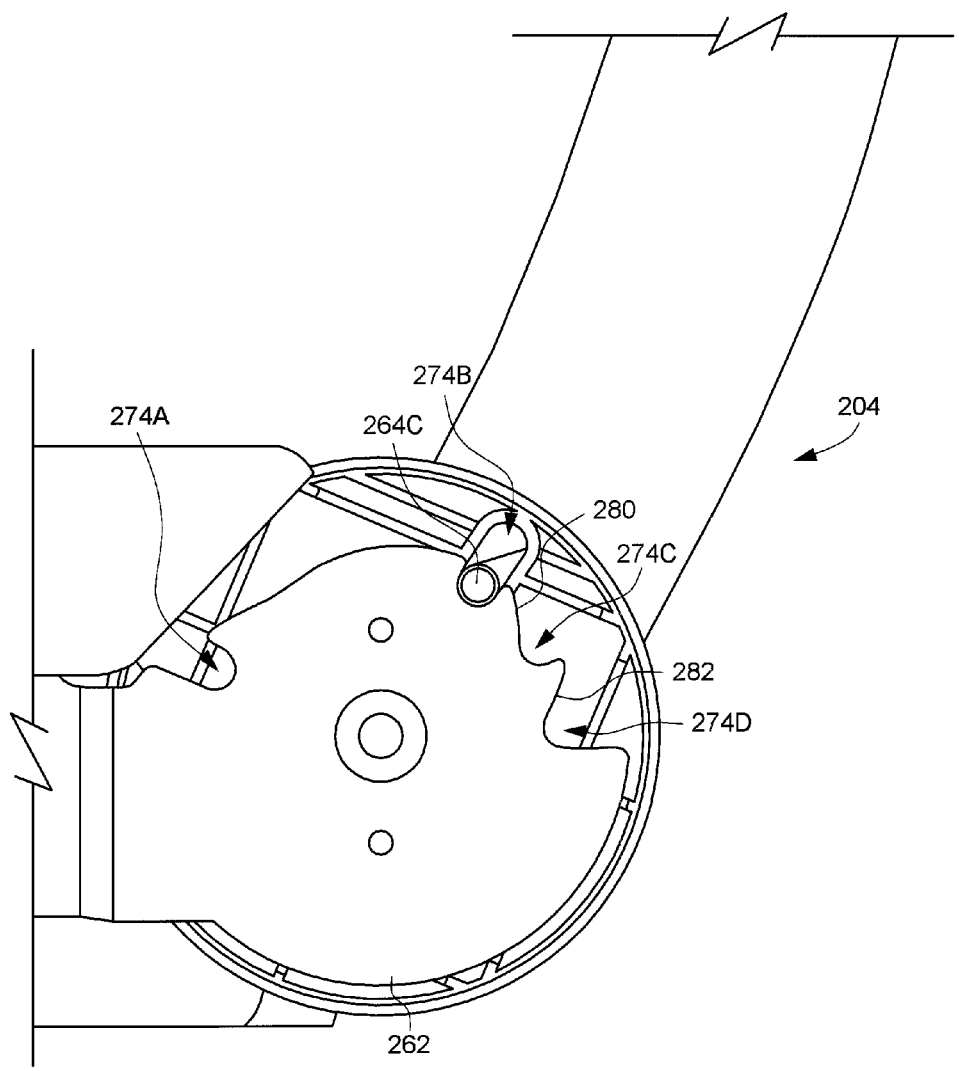
FIG. 23B is a schematic view illustrating the engagement between the latching element and the holder base for holding the backrest in the position shown in FIG. 23A.

FIG. 23A is a schematic side view illustrating a second position of the backrest 204 erected upward relative the seat 202, whereas FIG. 23B is a schematic view illustrating the engagement between the latching element 264 and the holder base 262 for holding the backrest 204 in the position shown in FIG. 23A. The backrest 204 can be typically turned to this configuration for seating a child on the stroller seat module 200. In this position, each of the extensions 264C of the latching element 264 can engage with a second locking groove 274B of the corresponding holder base 262 that can block all rotation of the backrest 204 (i.e., in clockwise and anti-clockwise directions). Accordingly, the release actuator 266 has to be operated to unlock the backrest 204 before adjusting the backrest 204 from the position of FIG. 23A.

Figure 24A:
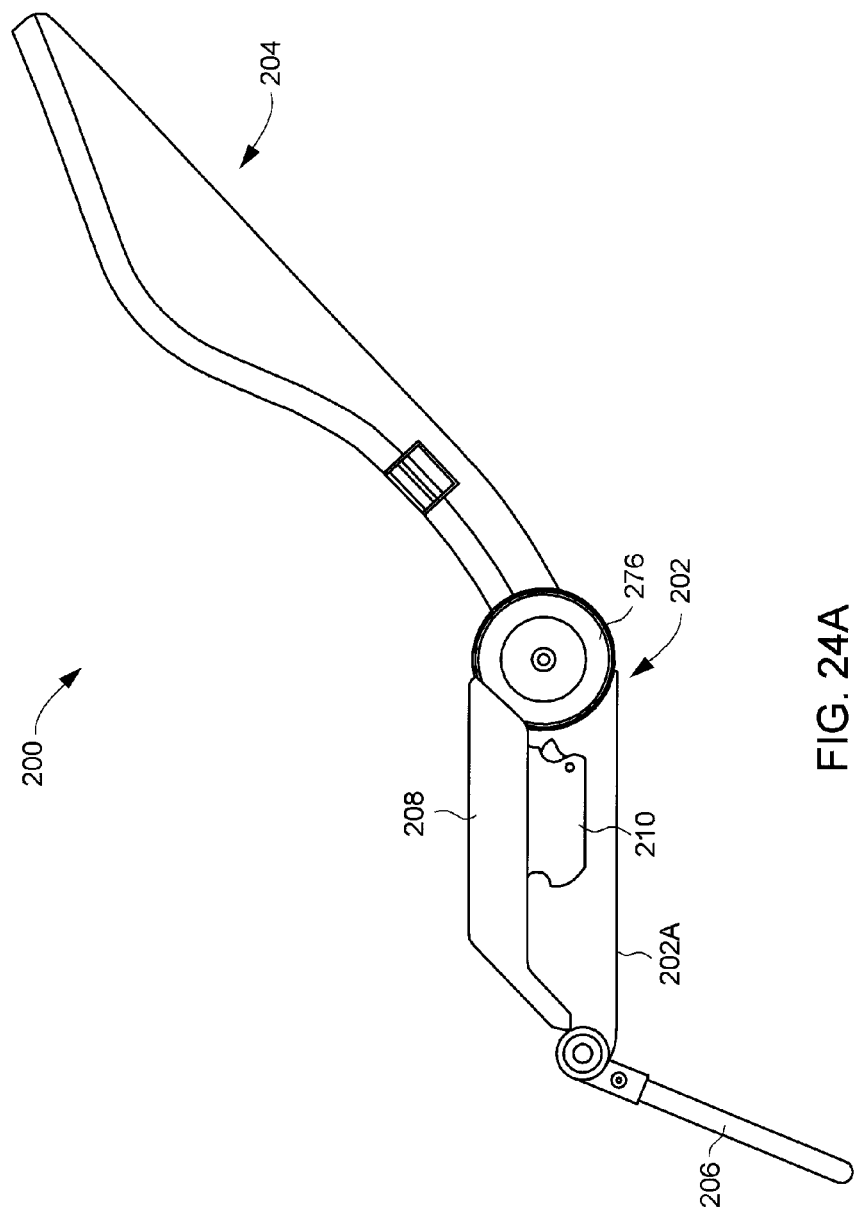
FIG. 24A is a schematic side view illustrating a third position of the backrest reclined rearward from the configuration of FIG. 23A.
Figure 24B:
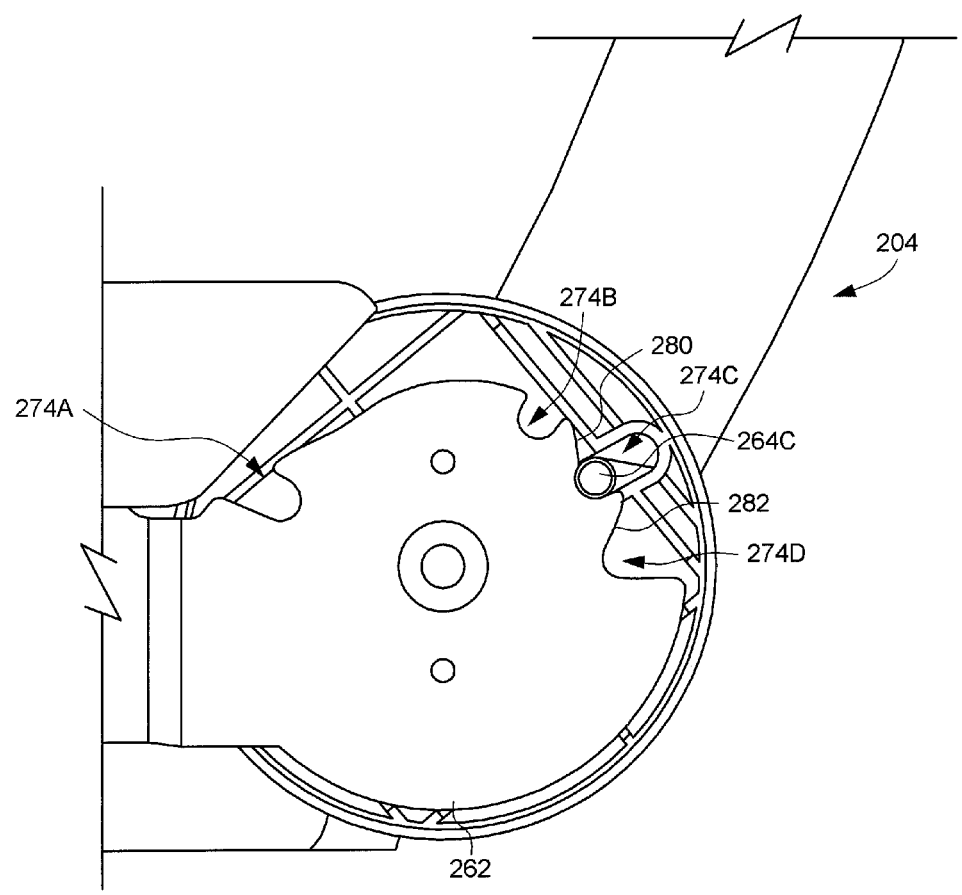
FIG. 24B is a schematic view illustrating the engagement between the latching element and the holder base for holding the backrest in the position shown in FIG. 24A.

FIG. 24A is a schematic side view illustrating a third position of the backrest 204 reclined rearward from the configuration of FIG. 23A, whereas FIG. 24B is a schematic view illustrating the engagement between the latching element 264 and the holder base 262 for holding the backrest 204 in the position shown in FIG. 24A. The backrest 204 can be turned to this reclined position for providing a comfortable seating environment. In this reclined position, each of the extensions 264C of the latching element 264 can engage with a third locking groove 274C of the corresponding holder base 262 that can hold the backrest 204 and block its rotation in a rearward direction, but yet allow its rotation toward the position shown in FIG. 23A. Before adjusting the backrest 204 rearward from the position shown in FIG. 24A, the release actuator 266 thus has to be operated to unlock the backrest 204. However, in case the backrest 204 is to be adjusted to a forward position, the backrest 204 may be directly rotated forward without the need of pulling on the handle 266C to unlock the latching element 164. As the backrest 204 pivots forward from the position of FIG. 24A, a slopped surface 280 of the third locking groove 274C can exert a counteraction that pushes the corresponding extension 264C of the latching element 264 to self disengage from the third locking groove 274C. Once the backrest 204 reaches the position shown in FIG. 23A, the spring force from the spring elements 268 can cause the extensions 264C to respectively engage with the second locking grooves 274B.

Figure 25A:
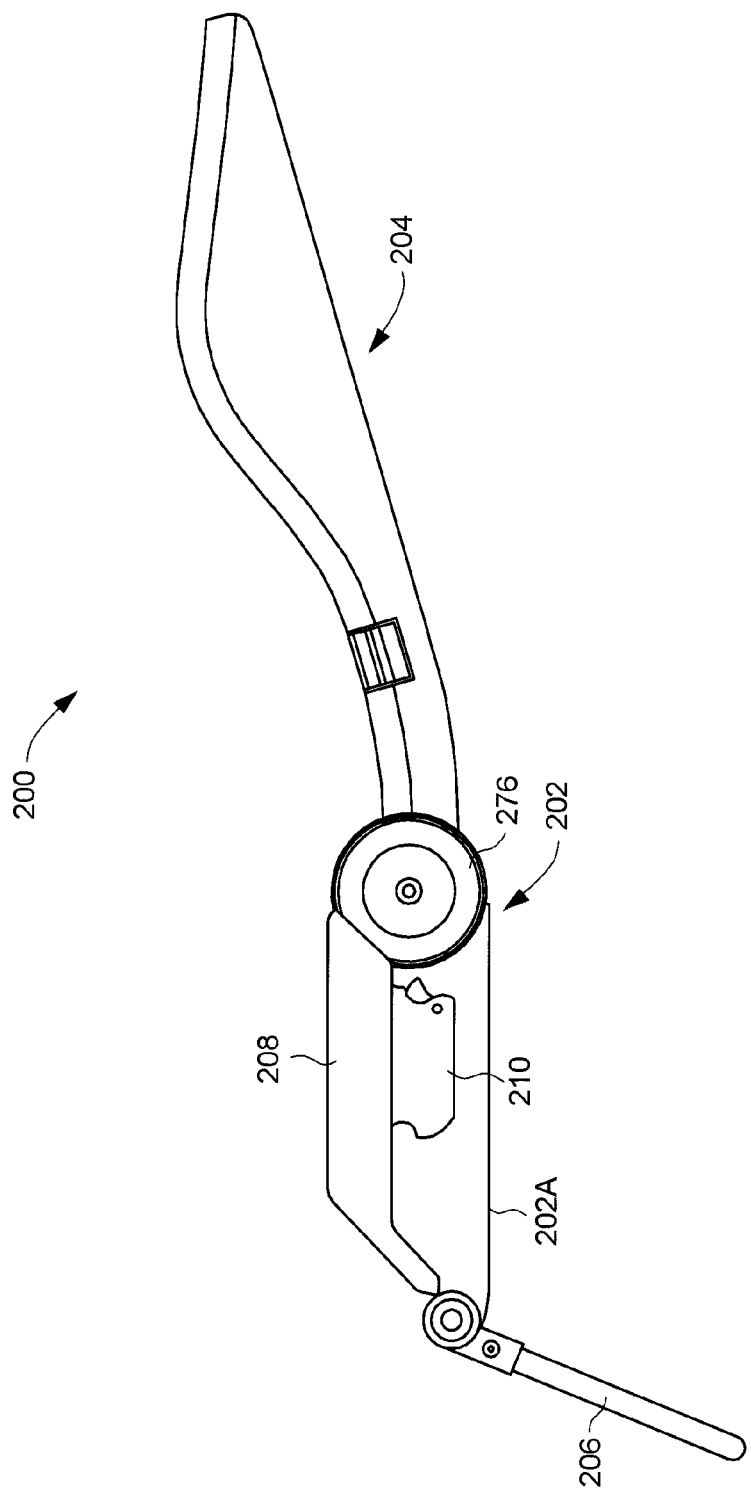
FIG. 25A is a schematic side view illustrating the stroller seat module shown in FIG. 19 with the backrest in a fourth position laid down substantially horizontal.
Figure 25B:
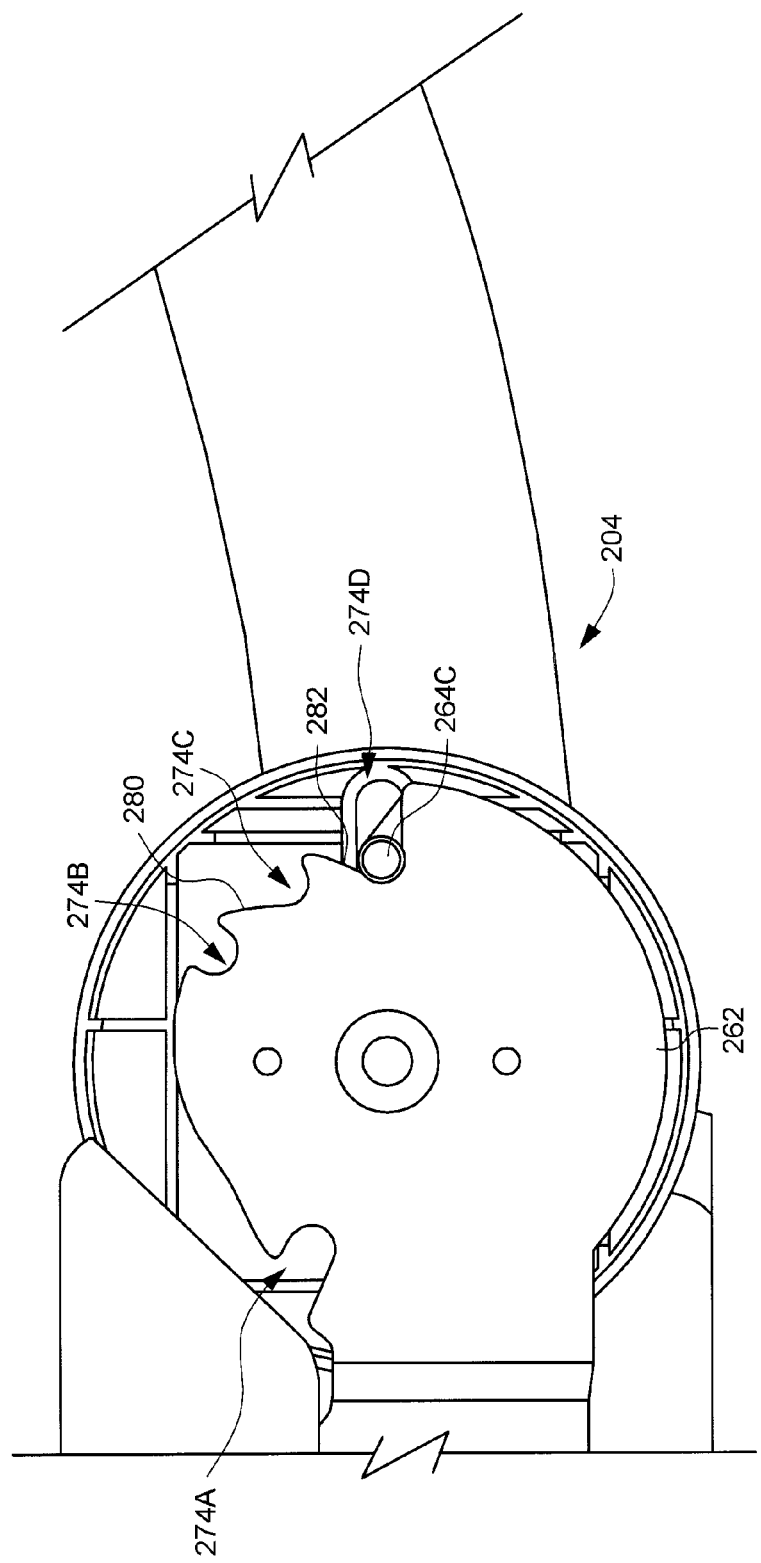
FIG. 25B is a schematic view illustrating the engagement between the latching element and the holder base for holding the backrest in the position shown in FIG. 25A.

FIG. 25A is a schematic side view illustrating a fourth position of the backrest 204 laid down substantially horizontal, whereas FIG. 25B is a schematic view illustrating the engagement between the latching element 264 and the holder base 262 for holding the backrest 204 in the position shown in FIG. 25A. The backrest 204 can be turned to this configuration for providing a comfortable sleeping position to a child, or facilitate storage (for example as shown in FIG. 17). In this position, each of the extensions 264C of the latching element 264 can engage with a fourth locking groove 274D of the corresponding holder base 262 that can hold the backrest 204 and block its rotation in a rearward direction, but yet allow its rotation in a forward direction. Accordingly, in case the backrest 204 is to be adjusted, the backrest 204 may be directly rotated forward without the need of pulling on the handle 266C to unlock the latching element 264. As the backrest 204 pivots forward from the position of FIG. 25A, a slopped surface 282 of the fourth locking groove 274D can exert a counteraction that pushes the extension 264C of the latching element 264 to self disengage from the fourth locking groove 274D. Once the backrest 204 reaches the desired position (for example the one shown in FIG. 24A or 23A), the spring force from the spring elements 268 can cause the extensions 264C to respectively engage with the corresponding locking grooves (for example, locking groove 274C or 274B).

It will be appreciated that the stroller seat module 200 has been described as one specific embodiment of child support accessory. As described hereafter, the mounting system described herein can also be adapted for attaching other types of support accessories on the stroller frame 102.

Figure 26:
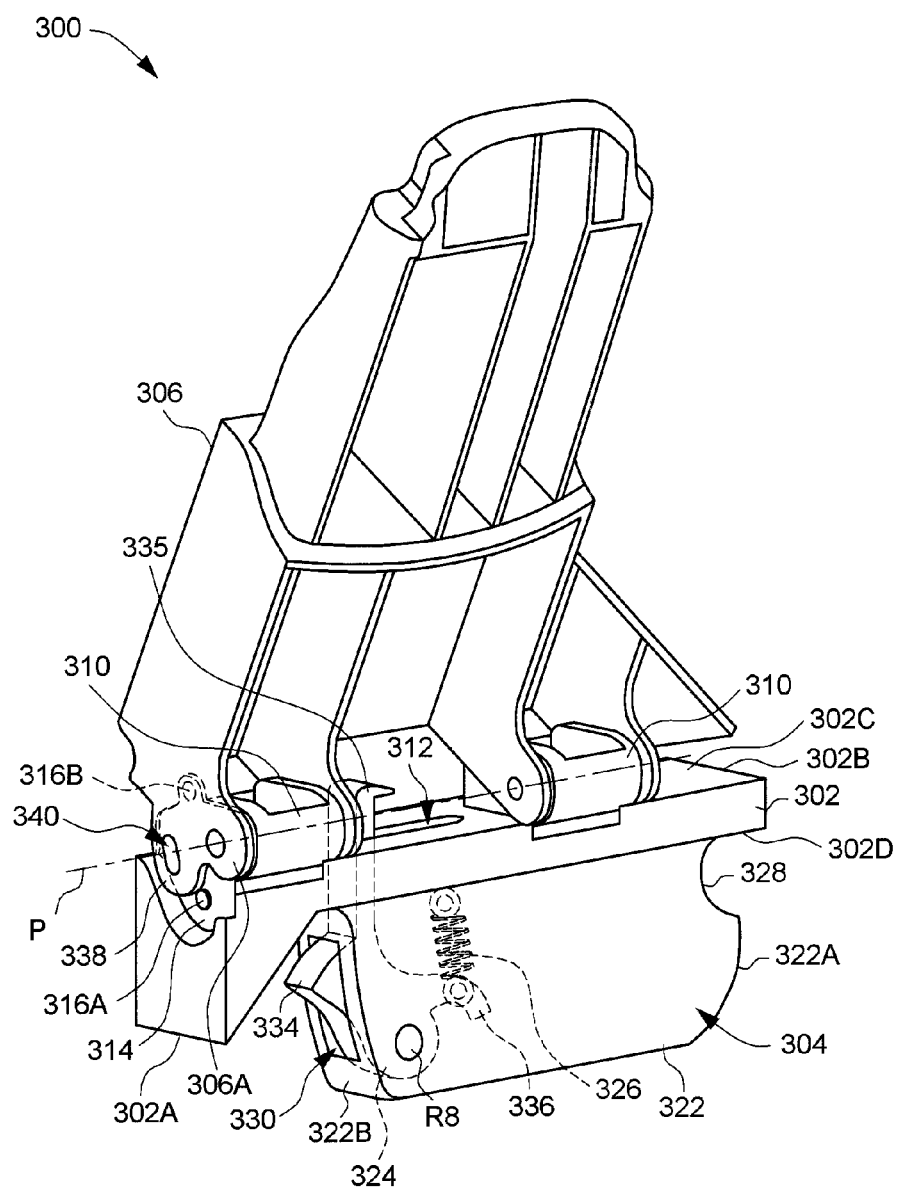
FIG. 26 is a schematic view illustrating another example of a support accessory embodied as a support adapter that can be attached with the mounting fixture on the left and right sides of the stroller frame.

FIG. 26 is a schematic view illustrating an example of a support accessory embodied as a support adapter 300 that can be attached with the mounting fixture 140 on the left and right sides of the stroller frame 102. Once securely attached with the mounting fixtures 140, the adapter 300 can be used for mounting various types of portable child carriers such as a carrycot or bassinet. As shown, the support adapter 300 can include a base 302 provided with a connector 304, and a rotary bracket 306 pivotally connected with the base 302.

The base 302 can have an elongated shape having a front 302A, a rear 302B, and opposite upper and lower surfaces 302C and 302D that extend parallel to a length of the base 302 from the front 302A to the rear 302B. The upper surface 302C can include one or more pivot knuckle 310 that define a pivot axis P extending generally along the length of the base 302. A portion of the first surface 302C also includes an opening 312 located proximate to the front 302A of the base 302. The front 302A of the base 302 includes a recessed surface 314 that is provided with protruding bumps 316A and 316B disposed at two different radial positions relative to the pivot axis P.

Referring again to FIG. 26, the connector 304 can be integrally connected with the lower surface 302D of the base 302.

The connector 304 can be structurally similar to the connector 210 described previously, including a housing 322, a latch 324 and a spring 326. The housing 322 can have an elongated shape extending along the length of the base 302. The elongated shape of the housing 322 can have a first end 322A provided with a first abutting structure 328, and an opposite second end 322B having an opening 330 that communicates with an interior of the housing 322. The interior of the housing 322 also communicates with the opening 312 on the upper surface 302C of the base 302.

The latch 324 can be pivotally assembled in the housing 322 via the pivot link R8, and includes a second abutting portion 334, an extension arm 335 that projects upward through the opening 312, and a prong 336. The second abutting portion 334, extension arm 335 and prong 336 are respectively disposed at different radial directions relative to the pivot link R8 of the latch 324. When the latch 324 rotates relative to the housing 322, the second abutting portion 334 can either protrude outside the housing 322 through the opening 330 at a position longitudinally opposite to the first abutting portion 328, or retract into the housing 322.

The spring element 326 is coupled with the prong 336 of the latch 324. The spring element 326 can be coupled between the prong 336 and an anchor (not shown) affixed on an inner sidewall of the housing 322 in the same manner as previously described. In one embodiment, the spring element 326 can be an extension spring adapted to bias the latch 324 in a direction for causing the second abutting portion 334 to protrude out of the opening 330.

Referring again to FIG. 26, the bracket 306 has at least one fork portion 306A that is pivotally coupled with the pivot knuckle 310. Accordingly, the bracket 306 can rotate about the pivot axis P relative to the base 302 for adjustment between multiple positions. The fork portion 306A can include an ear portion 338 in which is formed an eyelet 340 having a width equal or slightly smaller than the bumps 316A and 316B.

Figure 27:
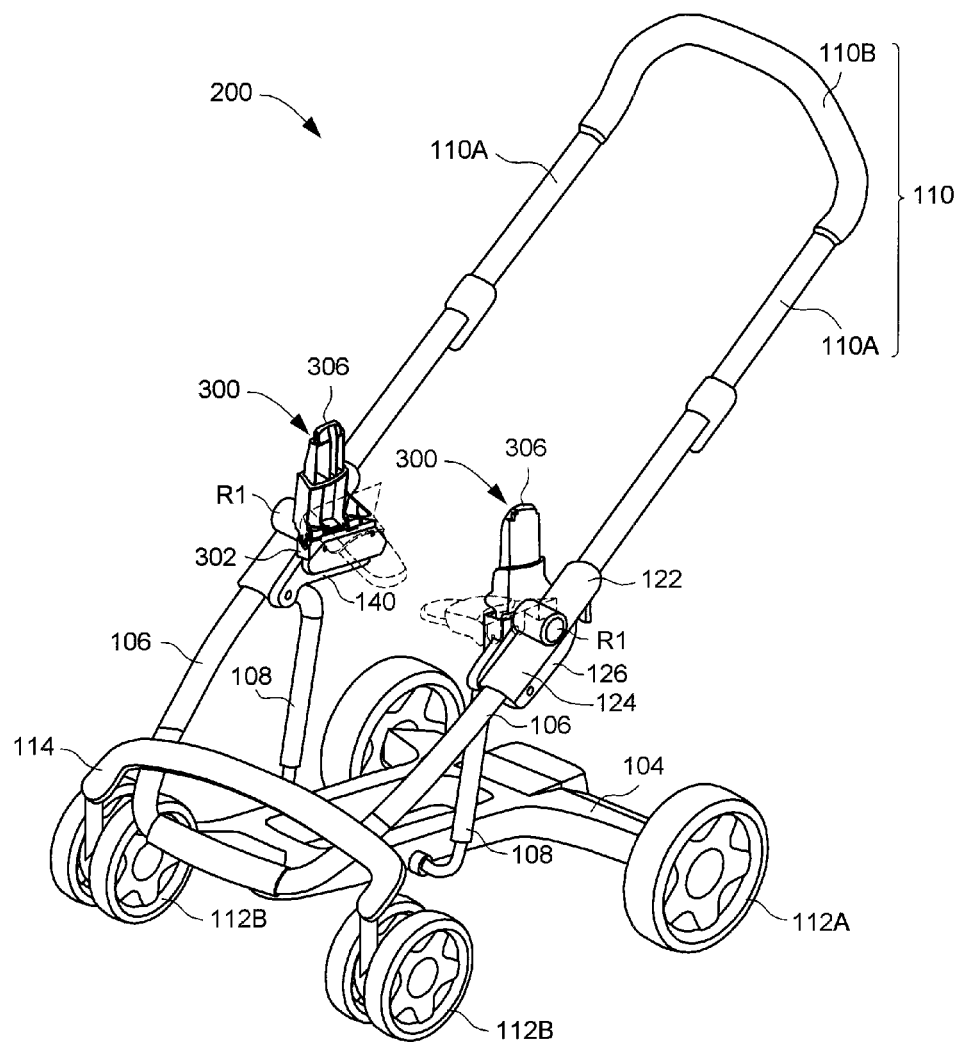
FIG. 27 is a schematic view illustrating the support adapter installed on the stroller frame.

In conjunction with FIGS. 1 and 5, FIG. 27 is a schematic view illustrating the support adapter 300 installed on the stroller frame 102. The support adapter 300 can be installed on the stroller frame 102 in the same manner as described previously. More specifically, the support adapter 300 can be placed such that the first abutting portion 328 of the connector 304 contacts with or lies adjacent to the second catching structure 148B of the mounting fixture 140 on the stroller frame 102. The support adapter 300 can be then rotated about the second catching structure 148B for inserting the connector 304 into the slot 146 of the mounting fixture 140. As the support adapter 300 rotates and the connector 304 inserts into the mounting fixture 140, the second abutting portion 334 of the latch 324 can be pushed against the corresponding first catching structure 148A and retract into the interior of the connector 304, causing loading of the spring element 326. Once the connector 304 is fully inserted in the mounting fixture 140, the spring element 326 can drive reverse rotation of the latch 324 such that the second abutting portion 334 extends out of the connector 304 and engages with the first catching structure 148A. As a result, the first and second abutting portions 328 and 334 on opposite sides of the connector 304 can respectively engage with the second and first catching structures 148B and 148A of the mounting fixture 140 for locking the support adapter 300 in place on the stroller frame 102.

Figure 28:
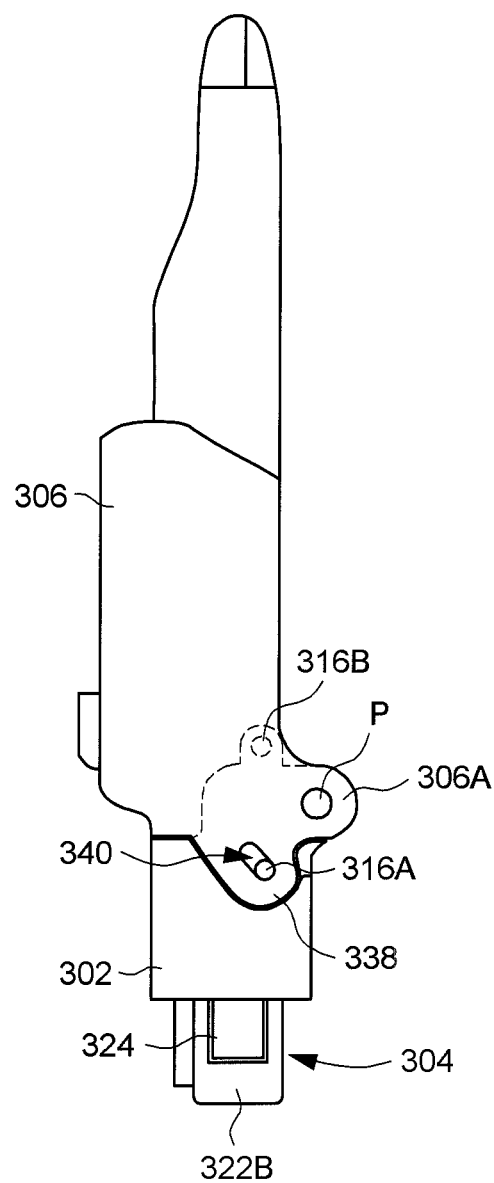
FIG. 28 is a schematic view illustrating the support adapter in a deployed state.
Figure 29:
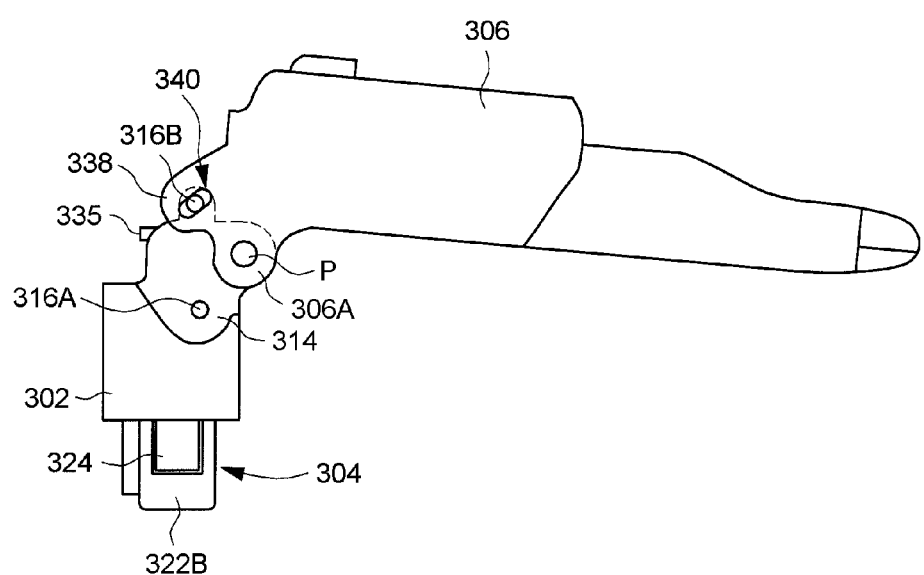
FIG. 29 is a schematic view illustrating the support adapter in a folded state.

In conjunction with FIG. 27, FIGS. 28 and 29 are schematic views respectively illustrating the support adapter 300 in a deployed and folded state. As shown in FIG. 28, in order to deploy the support adapter 300 for use, the bracket 306 can be rotated in a direction for aligning the bracket 306 and the base 302. Once the bracket 306 is fully deployed in alignment with the base 302, the ear portion 338 can fit with the recessed surface 314, and the eyelet 340 can tightly engage with the bump 316A for locking the bracket 306 in place relative to the base 302. In the deployed state, the bracket 306 can erect in a generally vertical position adapted to receive the placement of a portable child carrier, such as a carrycot or bassinet (not shown). Moreover, the bracket 306 can at least partially conceal the extension arm 335 for limiting access thereto, at least from the outer side of the support adapter 300. Accidental operation of the latch 324 that causes disengagement of the second abutting portion 334 from the first catching structure 148A can be thereby prevented.

Figure 30:
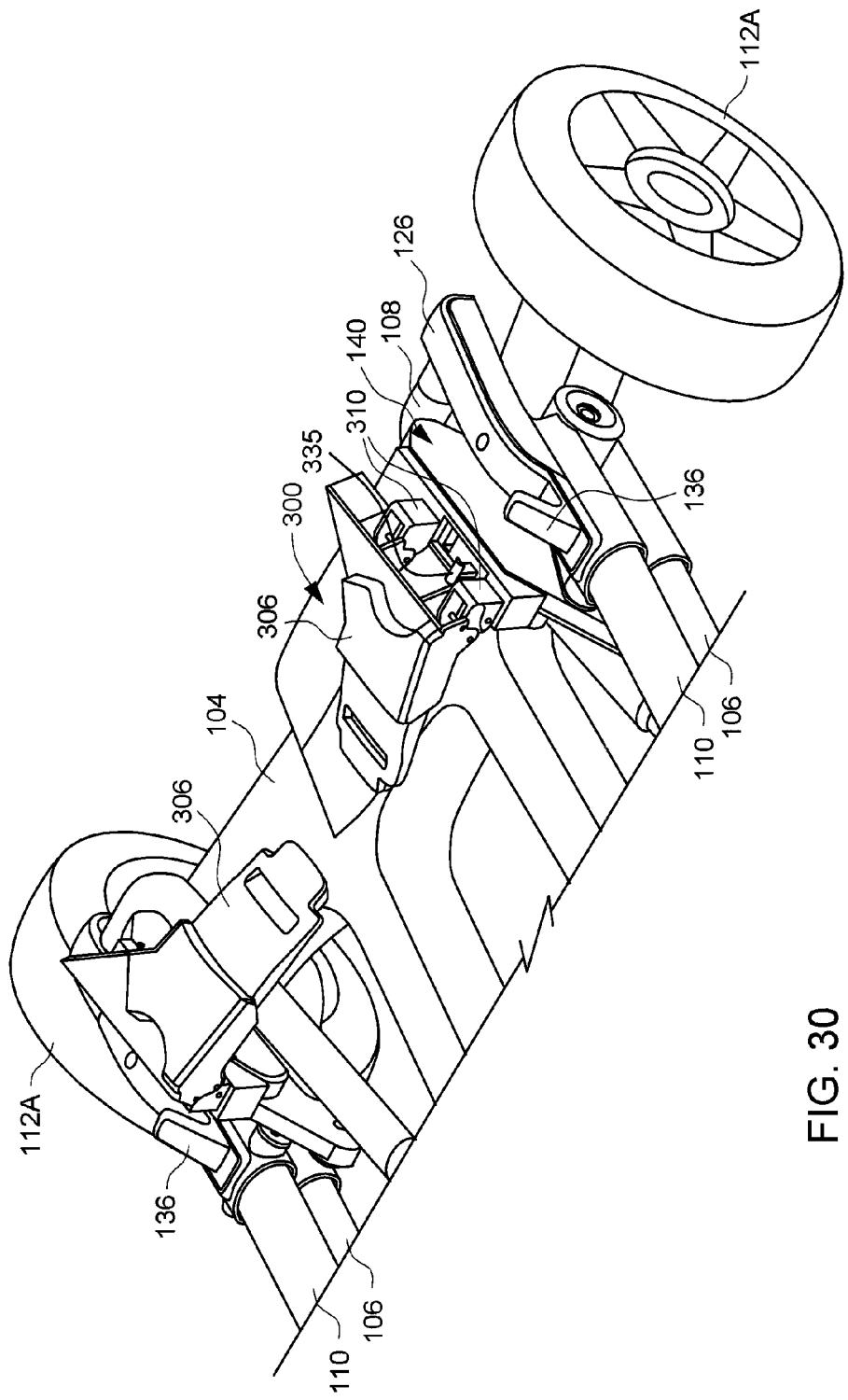
FIG. 30 is an enlarged view illustrating the stroller frame in a collapsed state and provided with the support adapters.

As shown in FIG. 29, when the support adapter 300 is not used, the bracket 306 can be rotated toward one lateral side of the base 302 until the eyelet 340 tightly engages with the bumps 316B. The bracket 306 can be thereby locked in a folded state, lying approximately perpendicular to the base 302 and extending in a generally horizontal plane between the handle side sections 110A (as represented by the dotted lines in FIG. 27). As shown in the enlarged view of FIG. 30, the folded state of the support adapter 300 may be particularly advantageous when the stroller frame 102 is in the collapsed state. In this configuration, the bracket 306 can be disposed generally parallel to the base 104 in a compact manner.

In the folded position, the bracket 306 uncovers and exposes the extension arm 335 of the latch 324 on the outer side of the support adapter 300. Accordingly, the extension arm 335 of the latch 324 can be easily accessed for operation from the outer side of the support adapter 300. When the support adapter 300 is to be detached from the mounting fixture 140, it is preferable to first turn the support adapter 300 to the folded position shown in FIG. 28 or exposing the extension arm 335. Then, the extension arm 335 can operated to rotate the latch 324 in a direction for retracting the second abutting portion 334 into the interior of the connector 304. Once the second abutting portion 334 is disengaged from the first catching structure 148A, the support adapter 300 can be rotated about the second catching structure 148B in the manner described previously for removing the connector 304 from the mounting fixture 140.

Figure 31:
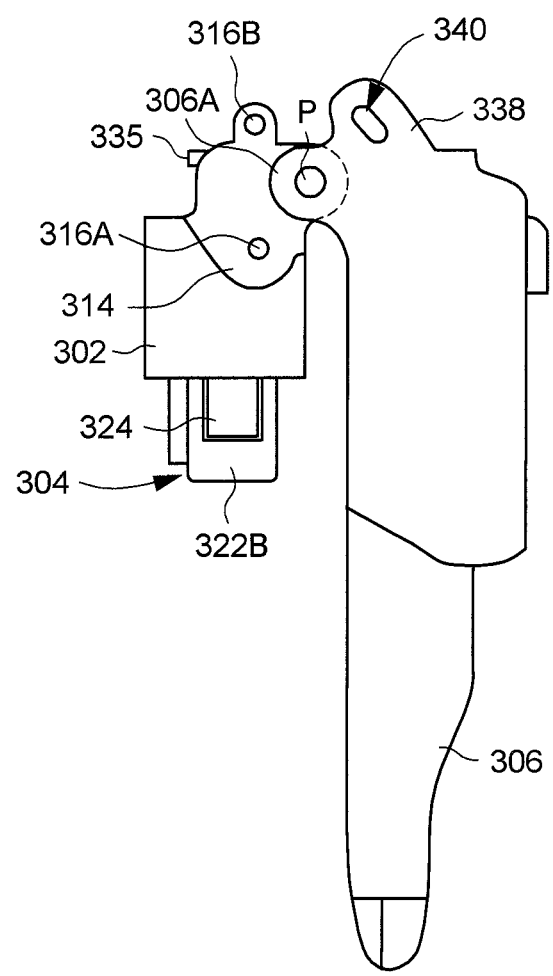
FIG. 31 is a schematic view illustrating the support adapter in a break-away state.

FIG. 31 is a schematic view illustrating the support adapter 300 in a break-away state. When the support adapter 300 is not used and detached from the stroller frame 102, the support adapter 300 can be folded substantially parallel over the lateral side of the base 302 in the break-away state for reducing the size of the support adapter 300. Accordingly, the storage of the support adapter can be facilitated in the break-away state.

Advantages of the system and method described herein include the ability to provide a mounting system through which a variety of child support accessory (such as seat module, support adapter for carrycot or bassinet) can be installed on the stroller frame in a convenient manner. The mounting system is easy to operate for locking and unlocking the child support accessory. Because the mounting system has a symmetrical locking construction, the child support accessory can be installed in different orientations on the stroller frame, e.g., rearward and forward facing configurations. Moreover, the design of the mounting system combined with the stroller frame allows to collapse the stroller frame with the child support accessory mounted thereon.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A mounting system for attaching a child support accessory on a stroller frame, comprising:
   a mounting fixture provided on the stroller frame, wherein the mounting fixture includes a housing having an upper surface where is opened a slot, the slot having a first length defined between two opposite sidewalls of the slot near the upper surface of the housing, and a second length greater than the first length at a deeper hollow region of the slot below the upper surface of the housing, the first and second lengths extending along a longitudinal axis of the slot; and
   a connector provided on the child support accessory, wherein the connector has an upper and a lower portion, the lower portion having a third length extending along the longitudinal axis of the slot that is greater than the first length of the slot, and the child support accessory having a front and a rear;
   wherein the connector is adapted to releasibly lock with the mounting fixture in either of a first configuration for holding the child support accessory in a first position on the stroller frame with the front of the child support accessory facing forward, and a second configuration for holding the child support accessory in a second position on the stroller frame with the front of the child support accessory facing rearward, and the connector and the child support accessory either facing forward or rearward are operable to pivot together relative to the housing in a direction for inserting the connector into the slot until the connector is locked with the housing of the mounting fixture.

2. The mounting system according to claim 1, wherein the child support accessory is a seat module having a front and a rear, the front of the seat module is oriented toward a front of the stroller frame when the connector locks with the mounting fixture in the first configuration, and the front of the seat module is oriented toward a rear of the stroller frame when the connector locks with the mounting fixture in the second configuration.

3. The mounting system according to claim 1, wherein
   the housing has a first and a second catching structure disposed opposite to each other; and
   the connector includes a first and second abutting portion formed on two opposite sides of the connector;
   wherein the first and second abutting portion respectively engage with the first and second catching structure when the connector locks with the mounting fixture in the first configuration, and the first and second abutting portion respectively engage with the second and first catching structure when the connector locks with the mounting fixture in the second configuration.

4. The mounting system according to claim 3, wherein the first and second catching structures are disposed at two opposite sides of the slot.

5. The mounting system according to claim 4, wherein the first and second catching structures include rounded protuberances forming the two opposite sidewalls of the slot.

6. The mounting system according to claim 4, wherein the first abutting portion includes a shoulder portion affixed on the connector.

7. The mounting system according to claim 4, wherein the second abutting portion is formed on a latch that is assembled with the connector and is movable relative to the connector to cause the second abutting portion to engage with either of the first and second catching structure after the connector is fully inserted inside the slot.

8. The mounting system according to claim 7, wherein the connector includes a casing in which the latch is pivotally assembled, the latch being movable to cause the second abutting portion to either extend out of the casing or retract inside the casing.

9. The mounting system according to claim 8, wherein the second abutting portion when retracted inside the casing disengages from either of the first and second catching structure while the connector is fully inserted in the slot.

10. The mounting system according to claim 8, wherein the latch is coupled with a spring element configured to bias the latch in a direction for causing the second abutting portion to extend out of the casing.

11. The mounting system according to claim 10, wherein the child support accessory is a seat module, the seat module including a seat and an actuator mechanism operable from a front of the seat to displace the latch in a direction for loading the spring element and retracting the second abutting portion inside the casing.

12. The mounting system according to claim 11, wherein the actuator mechanism includes a coupling plate connected with the latch and movable along a length of the seat, a transversal rod extending across a width of the seat, and a release handle affixed with the transversal rod.

13. A method of installing a child support accessory on a stroller frame, comprising:
   providing a mounting fixture on a stroller frame, wherein the mounting fixture includes a housing having an upper surface where is opened a slot, and a first and second catching structure disposed on opposite sides of the slot, the slot having a first length defined between two opposite sidewalls of the slot near the upper surface of the housing, and a second length greater than the first length at a deeper hollow region of the slot below the upper surface of the housing, the first and second lengths extending along a longitudinal axis of the slot;
   providing a connector on a child support accessory, wherein the connector includes a first and a second abutting portion formed on two opposite sides of the connector, and the connector further has an upper and a lower portion, the lower portion having a third length extending along the longitudinal axis of the slot that is greater than the first length of the slot, and the child support accessory having a front and a rear;
   for installing the child support accessory facing forward, arranging the child support accessory such that the front thereof is facing forward relative to the stroller frame and the first abutting portion is adjacent to the first catching structure, and rotating the child support accessory and the connector together about the first catching structure for inserting the connector into the slot, until the second abutting portion engages with the second catching structure to lock the child support accessory with the stroller frame; and
   for installing the child support accessory facing rearward, arranging the child support accessory such that the front thereof faces rearward relative to the stroller frame and the first abutting portion is adjacent to the second catching structure, and rotating the child support accessory and the connector together about the second catching structure for inserting the connector into the slot, until the second abutting portion engages with the first catching structure to lock the child support accessory with the stroller frame.

14. The method according to claim 13, wherein the first abutting portion is affixed on the connector, and the second abutting portion is formed on a movable latch assembled with the connector.

15. The method according to claim 14, further comprising:
operating the latch to cause the second abutting portion to disengage from either of the second catching structure and the first catching structure; and
rotating the child support accessory about either of the first catching structure and the second catching structure for removing the connector from the slot and detaching the child support accessory from the stroller frame.

16. A mounting system for attaching a child support accessory on a stroller frame, comprising:
a mounting fixture provided on the stroller frame, wherein the mounting fixture includes a housing having an upper surface where is opened a slot, the housing further including a first catching structure disposed on a first sidewall of the slot, and a second catching structure disposed on a second sidewall of the slot opposite to the first catching structure; and
a connector provided on the child support accessory, the connector including a first and a second abutting portion disposed on two opposite sides of the connector;
wherein the connector is configured to releasibly lock with the mounting fixture in a first configuration where the child support accessory is in a first position facing forward relative to the stroller frame, and a second configuration where the child support accessory in a second position facing rearward relative to the stroller frame, and the connector and the child support accessory either facing forward or rearward are operable to pivot together relative to the housing in a direction for inserting the connector into the slot until the connector is locked with the housing of the mounting fixture, the first and second abutting portion respectively lying adjacent to the first and second catching structure when the child support accessory is locked with the stroller frame in the first position facing forward.

17. The mounting system according to claim 16, wherein the first abutting portion is further adapted to abut against the second catching structure, and the connector is operable to pivot toward an interior of the slot about the second catching structure while the first abutting portion is maintained adjacent to the second catching structure, until the second abutting portion engages with the first catching structure, whereby an interference is created between the first catching structure and the second abutting portion and between the second catching structure and the first abutting portion to lock the child support accessory with the stroller frame in the second position facing rearward.

18. The mounting system according to claim 16, wherein the first abutting portion includes a shoulder portion affixed on the connector, and the second abutting portion is formed on a latch that is assembled with the connector, the latch being movable relative to the connector to cause the second abutting portion to engage with either of the first and second catching structure when the connector is inserted inside the slot.

19. The mounting system according to claim 18, wherein the connector includes a casing in which the latch is pivotally assembled, the latch being movable to cause the second abutting portion to either extend out of the casing for engaging with either of the first and second catching structure, or retract inside the casing for disengaging from either of the first and second catching structure.

20. The mounting system according to claim 19, wherein the latch is coupled with a spring element configured to bias the latch in a direction for causing the second abutting portion to extend out of the casing.

21. The mounting system according to claim 20, wherein the child support accessory is a seat module, the seat module including a seat and an actuator mechanism operable from a front of the seat to displace the latch in a direction for loading the spring element and retracting the second abutting portion inside the casing.

22. The mounting system according to claim 16, wherein the first abutting portion includes a shoulder portion formed from a casing of the connector.

23. The mounting system according to claim 16, wherein the first and second catching structures are respectively rounded protuberances projecting from the first and second sidewalls of the slot.

* * * * *